United States Patent
Amato

(10) Patent No.: US 9,907,119 B2
(45) Date of Patent: Feb. 27, 2018

(54) HEATABLE FLUID BAG

(71) Applicants: David John Amato, Auckland (NZ); Huiquan Zhang, Auckland (NZ)

(72) Inventor: David John Amato, Auckland (NZ)

(73) Assignee: David John Amato, Auckland (NZ)

( * ) Notice: Subject to any disclaimer, the term of this patent is extended or adjusted under 35 U.S.C. 154(b) by 135 days.

(21) Appl. No.: 14/424,228

(22) PCT Filed: Sep. 6, 2013

(86) PCT No.: PCT/NZ2013/000162
§ 371 (c)(1),
(2) Date: Feb. 26, 2015

(87) PCT Pub. No.: WO2014/038964
PCT Pub. Date: Mar. 13, 2014

(65) Prior Publication Data
US 2015/0230291 A1    Aug. 13, 2015

(30) Foreign Application Priority Data

Sep. 7, 2012 (NZ) ........................................ 602325
Dec. 21, 2012 (NZ) ........................................ 605184

(51) Int. Cl.
*H05B 3/80* (2006.01)
*H05B 3/34* (2006.01)
(Continued)

(52) U.S. Cl.
CPC .............. *H05B 3/80* (2013.01); *A47J 41/005* (2013.01); *H05B 3/34* (2013.01); *H05B 3/48* (2013.01);
(Continued)

(58) Field of Classification Search
CPC ... H05B 3/14; H05B 3/34; H05B 3/48; H05B 3/80; H05B 3/82; H05B 2203/02;
(Continued)

(56) References Cited

U.S. PATENT DOCUMENTS 1,086,646 A    2/1914 Christian
2,178,397 A *  10/1939 Larkey ................. A47J 41/005
                                                219/523

(Continued)

FOREIGN PATENT DOCUMENTS

CA        2802923 A1    3/2012
CN       201022781 Y    2/2008
(Continued)

OTHER PUBLICATIONS

May 28, 2014 International Search Report issued in Application No. PCT/NZ13/000162.
(Continued)

*Primary Examiner* — Brian Jennison
(74) *Attorney, Agent, or Firm* — Oliff PLC

(57) ABSTRACT

A heater element for a heatable fluid filled bag includes a heat generating member having a power connecting member means to allow the heater element to be heated when connected to a power source. The element also includes a first insulation layer having ends and a first heat conductive layer having ends. The heat generating member is covered with the first insulation layer followed by the first heat conductive layer to cover the first insulation layer, which are held together at their ends with inner end support members. The inner end support members is insulative having at least one inner end support member with at least one aperture to allow the power connecting member means there through.

17 Claims, 19 Drawing Sheets

(51) Int. Cl.
   *A47J 41/00* (2006.01)
   *H05B 3/48* (2006.01)
(52) U.S. Cl.
   CPC .. *H05B 2203/021* (2013.01); *H05B 2203/022* (2013.01)
(58) Field of Classification Search
   CPC ......... H05B 2203/021; H05B 2203/022; A47J 41/005; A47J 27/21
   See application file for complete search history.

(56) References Cited

U.S. PATENT DOCUMENTS

| | | | | |
|---|---|---|---|---|
| 2,507,750 | A | * | 5/1950 | Barlow ................ A47C 21/048 219/481 |
| 4,543,469 | A | | 9/1985 | Cunningham |
| 5,247,158 | A | * | 9/1993 | Steinhauser ............ H05B 3/46 219/534 |
| 5,598,502 | A | * | 1/1997 | Takahashi ................ H05B 3/14 219/505 |
| 2010/0264127 | A1 | * | 10/2010 | Ando ...................... A47J 27/21 219/458.1 |

FOREIGN PATENT DOCUMENTS

| | | |
|---|---|---|
| DE | 2343940 A1 | 3/1975 |
| GB | 660759 A | 11/1951 |
| GB | 2334452 A | 8/1999 |
| KR | 2005-0000588 B1 | 4/2005 |

OTHER PUBLICATIONS

Mar. 10, 2015 International Preliminary Report on Patentability issued in Application No. PCT/NZ2013/000162.

Apr. 4, 2016 Search Report issued in European Patent Application No. 13835452.

* cited by examiner

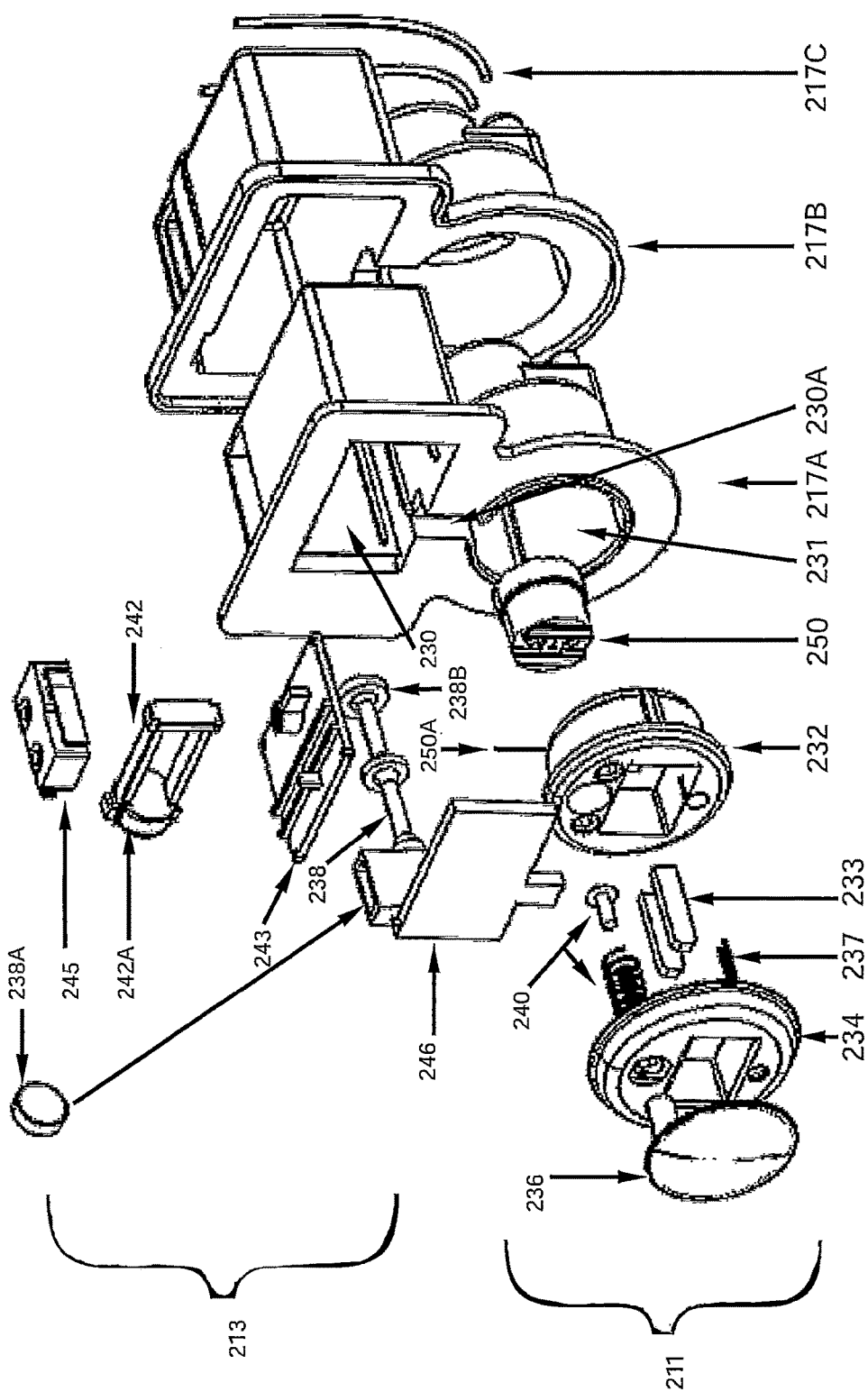

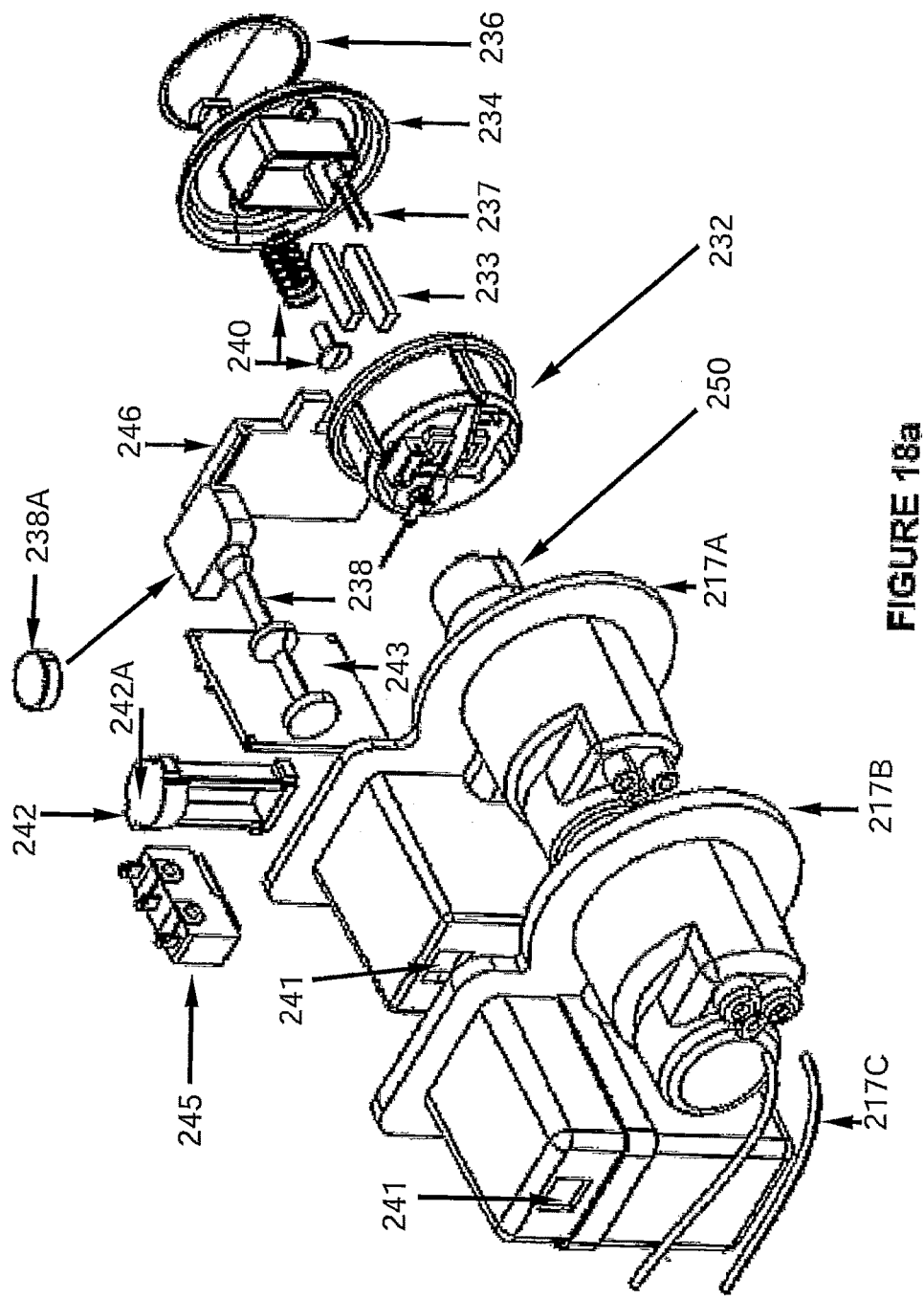

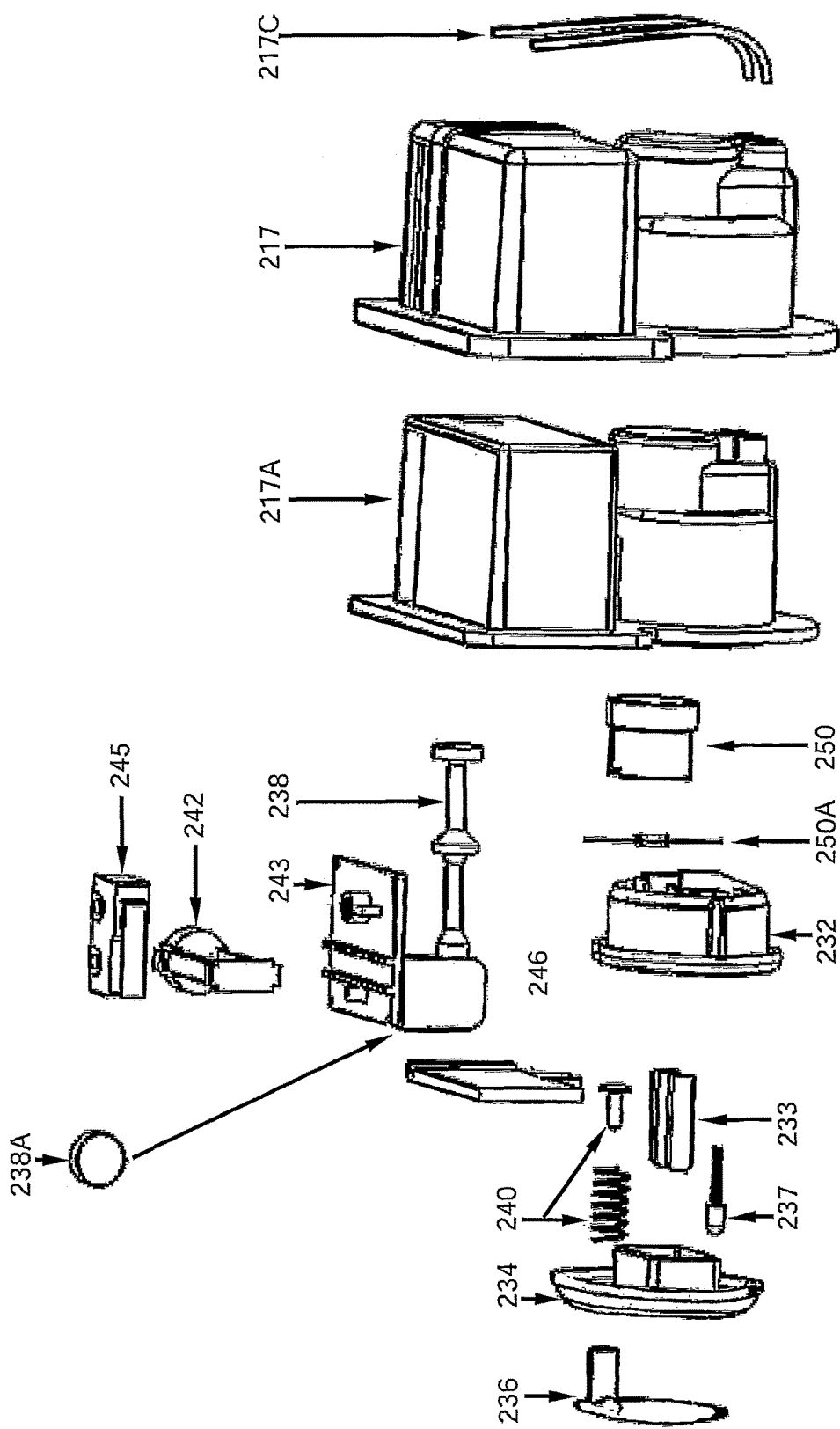

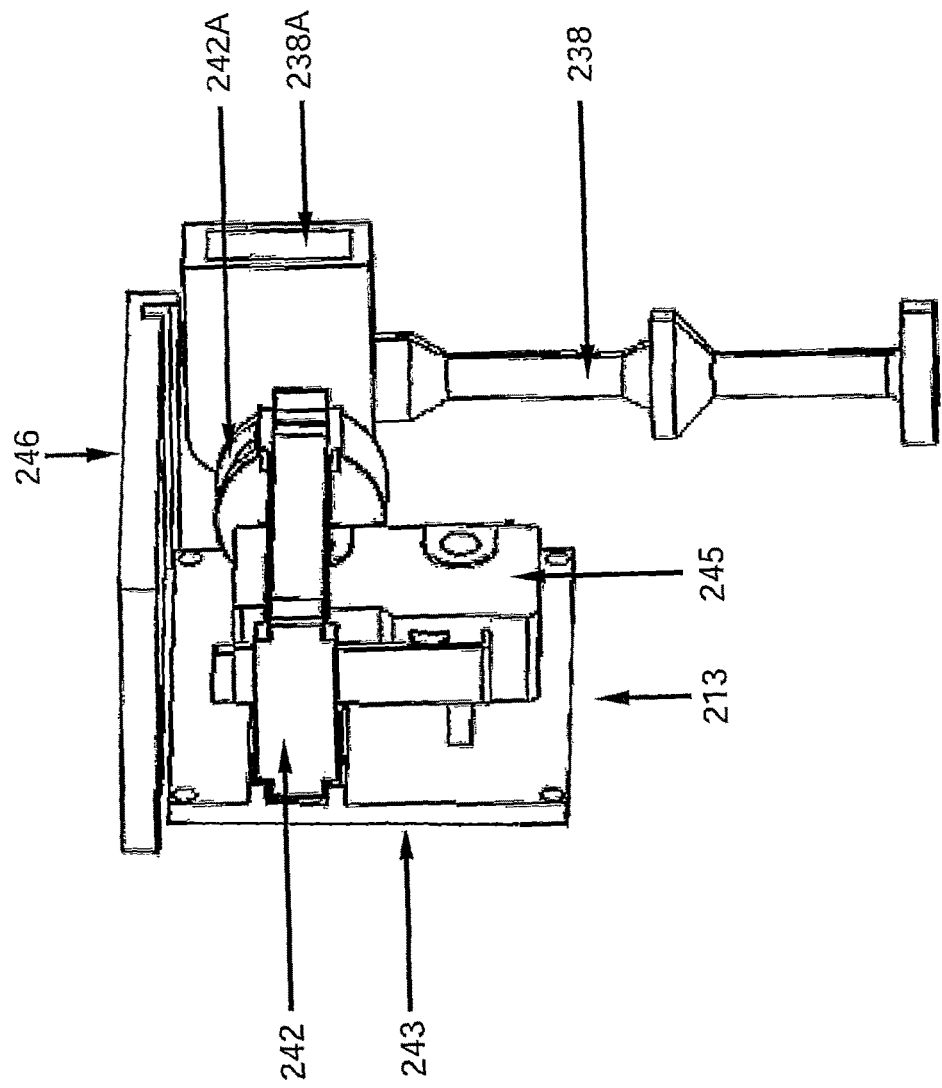

HEATABLE FLUID BAG

The invention relates to a fluid bag which includes a body of fluid contained in a bag or pouch which is able to be heated or cooled. The invention is directed particularly but not solely towards a heater for a portable fluid bag.

BACKGROUND OF INVENTION

Hot water bottles have been known for many years. Though these are cheap, they are difficult to fill and the heating does not last long. Many accidents occur when pouring in hot water causing scalds and burns to the user. Additionally these hot water bottles have screw stoppers which can be very difficult to use by the elderly or very young. It is well known that these types of bottles do not retain the heat for very long.

Simple electrodes like that used in a kettle, are not allowed to be used with any device that can be electrically charged and or that can touch the body or can be touched as the risk of burning or electric shock is very high.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

OBJECT OF THE INVENTION

It is an object of the invention to provide an improved heatable or coolable fluid bag and fluid heater that ameliorates some of the disadvantages and limitations of the known art or at least provide the public with a useful choice.

SUMMARY OF INVENTION

In a first aspect the invention may broadly be said to reside in a heatable fluid bag comprising a bag having sides, adapted to provide an enclosed space for containing a fluid therein, the bag including the following components of at least one heating element, power connection means, circuit and switching means at least one mechanical switch, whereby the components are arranged to be electrically connected together inside the bag so that when the power connection means is connected to a power source it causes the heating element to be heated to heat the fluid wherein the magnetic switch is adapted to protect against a build up of gasses or pressure and prevent explosion, the magnetic switch includes an elongate member having ends wherein one end is connected to the circuit located at one side of the inside of the bag and the other end is connected to the inside of an other side of the bag whereby the circuit can be broken if the bag expands beyond a certain distance between the sides of the bag whereby after the bag is heated to a certain temperature by the heating element, it is can be disconnected from the power source to enable the bag to be used as a portable heating member.

Preferably the power connection means is formed as part of a housing which includes a socket for a plug of the power source wherein the housing is connected to the inside of the bag but is electrically and fluidly separated from the enclosed fluid.

Preferably the bag can be heated within 10 minutes and when disconnected form the power source, the heating of the bag can last for 5 hours.

Preferably one end of the elongate member is welded to the inside of the bag.

Preferably, the housing includes at least one bleed valve which comprises at least one deformable aperture located with the housing containing the switch which is adapted to remove excess pressure within the bag wherein the aperture is joined to the fluid or the enclosed space with the bag. Preferably double insulation is provided for all electrical circuits, connectors, wiring and switching components.

Preferably the bag is formed from a material having a material formed of at least one ply of PVC with welded seems and the housing includes at least one thermostat for temperature control. Preferably the heater element includes a heating wire encased by a heater cage which includes a thermal link fuse, wherein the heater cage is attached to the bag within the enclosed space but the heating wire is electrically and fluidly separated there from.

Preferably the heater cage includes upper and lower casing members 51 & 63 with doubly insulated heating wire encased therein wherein the double insulation includes an alternating sequence of insulation sheets and conducting sheets whereby the insulating sheet includes mica material and the conducting sheet includes aluminium.

Preferably the sequence of insulating and conducting sheets can include first outer conducting sheet 52 (outer aluminium shell), first outer insulation sheet 53 (mica sheet), first inner conducting sheet 54 (inner aluminium sheet), first inner insulation sheet 55 (mica sheet), middle outer perimeter ring 56 (plastic ring), mica support skeleton member for heating wire 57, heating wire 58, second inner insulation sheet 59 (mica sheet), second conducting sheet 60—(aluminium sheet), second outer insulation sheet 61 (mica sheet), second outer conducting sheet 62 (aluminium sheet). Preferably the heater element can be U shaped or planar shaped and the fluid can be any fluid that can be heated or cooled.

Preferably the housing includes at least one earth test point to enable the earth connection to be verified and the housing includes an indication light electrically connected to the power connection to confirm that power is connected to the circuit. Preferably there is a removable probe located in a recess in the housing for allowing one to insert in the aperture of the bleed valve to allow air or gases to escape from the enclosed space of the bag.

In a second aspect the invention may broadly be said to reside in a heater element which includes a heating wire encased by a heater cage wherein the heater cage can be attached to an inside of a bag containing a fluid, with the heating wire electrically and fluidly separated there from and able to be connected to a power source to cause the wire to be heated to heat the fluid, the heater cage including upper and lower casing members 51 & 63 wherein an alternating sequence of insulation sheets and conducting sheets is located between the upper and lower casing members, wherein the sequence of insulating and conducting sheets can include first outer conducting sheet 52 (outer aluminium shell), first outer insulation sheet 53 (mica sheet), first inner conducting sheet 54 (inner aluminium sheet), first inner insulation sheet 55 (mica sheet), middle outer perimeter ring 56 (plastic ring), mica support skeleton sheet member for heating wire 57, heating wire 58, second inner insulation sheet 59 (mica sheet), second conducting sheet 60—(aluminium sheet), second outer insulation sheet 61 (mica sheet), second outer conducting sheet 62 (aluminium sheet) whereby the outer casing member are joined together.

Preferably the heater element includes a thermal fuse electrical joined to the heating wire to be set at a certain temperature to act as a safety mechanism if the heater wire overheats and the heater element can be U shaped or planar shaped and the insulating sheet includes a mica material and the conducting sheets includes an aluminium material.

In a third aspect the invention includes a cold fluid bag comprising a bag having sides, adapted to provide an enclosed space for containing a fluid therein and magnetic switch, whereby the fluid is adapted to be made frozen wherein the magnetic switch is adapted to protect against a build up of gasses pressure and prevent explosion and includes an elongate member having ends wherein one end is connected to the circuit located at one side of the inside of the bag and the other end is connected to the inside of an other side of the bag whereby the circuit can be broken if the bag expends beyond a certain distance between the sides of the bag wherein the fluid is antifreeze. Preferably, the housing includes at least one bleed valve which comprises at least one deformable aperture located with a housing containing the switch which is adapted to remove excess pressure within the bag.

In a fourth aspect the invention includes a heater element for a heatable fluid filled bag, element includes a heat generating member having a power connecting member means to allow the heater element to be heated when connected to a power source, a first insulation layer having ends and a first heat conductive layer having ends, whereby the heat generating member is covered with the first insulation layer followed by the first heat conductive layer to cover the first insulation layer, which are held together at their ends with inner end support members, the inner end support members being insulative having at least one inner end support member with at least one aperture to allow the power connecting member means there through.

Preferably the power connecting member means include at least one electrode in the form of an electrode plate member electrically connected to the heat generating member sandwiching the heat generating member there between electrode plate members wherein the power connecting member means includes at least one wire electrically connected to each electrode plate member allow for power or electrical connection there between the heater element and power connection means.

Preferably the heater element includes a second insulation layer having ends, a second heat conducting layer having ends and middle end support members, wherein the second insulation layer covers the first heat conducting layer and is in the form of a sleeve, followed by the second insulation layer shaped as a sleeve which covers the second insulation layer whereby the middle end support members are formed of insulation material and are adapted slidably interfit into the ends of the second insulation member and second heat conducting member to cover and abut the inner end support members and at least one middle end support member has at least one aperture to allow the power connecting member means there through.

Preferably the heat generating member is formed from (PTC) positive temperature coefficient, the first and second insulation layers are formed from plastics, and the first and second heat conducting layers are formed from a metal in the shape of a sleeve, wherein the inner end support members and middle end support members are formed as plate cap shaped members with an inner side with a protruding recessed lip portion, the apertures being formed as protruding cylindrical members on the opposite side of the plate cap to that of the lip portion.

Preferably the outer end support members abut the middle end support members on each end of the second heat conductive layer, whereby at least one outer end support member has apertures for the electrical connection there through which can be sealed to exclude fluid there through, the apertures of the inner, middle and outer end support members are aligned to allow electrical connection through all apertures wherein each outer end support member is L shaped with a foot adapted to allow for connect to an inside of the bag and fixing to the ends of the second heat conducting member.

Preferably the first and second insulation layers can each be formed as at least double insulation layers.

In a fifth aspect the invention includes a heatable fluid filled bag adapted to be electrically connected to a power source, the fluid filled bag includes a bag enclosing a fluid, at least one heater element, and housing including power connection means adapted to allow the bag to be electrically connected to a power source, the housing consists of at least one insulation layer, the heater element including a heat generating member having power connecting member means, a first insulation layer having ends and a first heat conductive layer having ends, whereby the heat generating member is covered with the first insulation layer followed by the heat conducting layer covering the first insulation layer, whereby the first second insulation layers and heat conducting layers are held together at their ends with inner end support members being insulative or are formed of insulation material and having at least one of the inner end support members with at least one aperture to allow the power connecting member means there through to connect to the power connection means.

Preferably the heater element includes a second insulation layer having ends, a second heat conducting layer having ends and middle end support members, wherein the second insulation layer covers the first heat conducting layer and is in the form of a sleeve, followed by the second insulation layer shaped as a sleeve which covers the second insulation layer whereby the middle end support members are formed of insulation material and are adapted slidably interfit into the ends of the second insulation member and second heat conducting member to cover and abut the inner end support members and at least one middle end support member has at least one aperture to allow the power connecting member means there through, wherein outer end support members abut the middle end support members on each end of the second heat conductive layer, whereby at least one outer end support member has apertures for the electrical connection there through which can be sealed to exclude fluid there through, the apertures of the inner, middle and outer end support member are aligned to allow electrical connection through all apertures wherein each outer end support member is L shaped with a foot adapted to allow for connect to an inside of the bag and fixing to the ends of the second heat conducting member.

Preferably the housing includes at least one inner housing including at least one recess for the power connection means, the recess for the power connection means includes a plug housing base adapted to slidably interfit within the inner housing and being cylindrically shaped with a recess therein, a plug holder having cylindrical cap with a plug recess which is adapted to receive electrical prongs followed by a plug prong holder fitting, followed by an access end cap attachable to the bag, the inner housing also has another recess for a safety switching means which includes a slide housing, switch, bar member with a magnet and an elongate member with a magnet joined at one end to the inside of the bag and an other end operatively connected by power connection member means to a switch and power connection means by abutting magnets whereby the slide housing holds the bar member, switch and one end of the elongate member having the magnet and expansion of the bag walls with the elongate member causes magnets to separate to cause the power connection means to the safety switch means to be non electrically connected to the power source.

Preferably the heat generating member is formed from (PTC) positive temperature coefficient, the first and second insulation layers are formed from plastics, and the first and second heat conducting layers are formed from a metal in the shape of a sleeve, wherein the inner end support members and middle end support members are formed as plate cap shaped members with an inner side with a protruding recessed lip portion, the apertures being formed as protruding cylindrical members on the opposite side of the plate cap to that of the lip portion.

Preferably the first and second insulation layers and housing can each be formed as at least double insulation layers, the bag includes an openable or closable bag opening in the form of a bleed valve or plug in hole, to allow air or fluid to be inputted or emptied from the bag and the bag includes a thermostat electrically attached to the power connection means between the plug holder housing and power connection recess, and the end cap can have an LED to show whether electrically connected or not.

Preferably the bag includes the safety switching means includes a magnet located in the elongate member which is joined to a magnet in the safety switching means. Preferably the fluid can include antifreeze to allow the bag to be cooled. Preferably the fluid can heated by the heater element to a temperature between −10° C. to 100° C.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be limiting.

BRIEF DESCRIPTION

The invention will now be described, by way of example only, by reference to the accompanying drawings:

FIG. 1, is a perspective view of a heatable or coolable fluid bag with a first heater element.

FIG. 2, is a perspective view of part of the magnetic switch

FIG. 3, is a perspective view of another part of the magnetic switch.

FIG. 4, is a perspective inner view of a casing for the first heater

FIG. 5, is a perspective view of the first heater

FIG. 6, is a perspective view of the housing for the bag

FIG. 6a, is a top plan view of the housing of FIG. 6

FIG. 7, is a rear perspective view of the end cap for the housing

FIG. 8, is a perspective view of a bleed hole probe

FIG. 9, is a perspective view of a second heater and housing for a heatable fluid bag.

FIG. 10, is a perspective view of the components of a third heater for a heatable fluid bag FIG. 11, is a perspective view of a bag with the third heater of FIG. 10

FIG. 12, is a perspective view of a fourth heater assembly for a heatable fluid bag FIG. 13, is a bottom plan view of the bag of FIG. 12

FIG. 14, is a side view of the bag of FIG. 12

FIG. 15, is a top plan view of the bag of FIG. 12

FIG. 16, is a perspective view of the heatable or coolable bag with a fifth heater element FIG. 17, is a perspective view of the components of the heater element of FIG. 16

FIG. 18, is a perspective view of the components of the power connection and safety switching means FIG. 18a, is rear perspective view of the arrangement as shown in FIG. 18

FIG. 18b, is a side perspective view

FIG. 18c, is perspective view of the safety switching means

FIG. 19, is a perspective view of the heater element of FIG. 18

DESCRIPTION OF DRAWINGS

The following description will describe the invention in relation to preferred embodiments of the invention, namely a heatable or coolable fluid bag and heater. The heatable fluid bag seeks to provide an insulated heater element with respect to a fluid. The invention is in no way limited to these preferred embodiments as they are purely to exemplify the invention only and that possible variations and modifications would be readily apparent without departing from the scope of the invention.

Heatable Fluid Bag

FIGS. 1-20 shows a heatable fluid bag 1 which comprises a bag 2, fluid 3 and components showing different examples for the heater element. The container 2 is formed of a material having an outer surface 5, inner surface 6, sides, and edges 8. The container 2 is adapted to provide a fluidly sealed enclosed space 8 for containing the fluid 3 therein.

Figure 1:
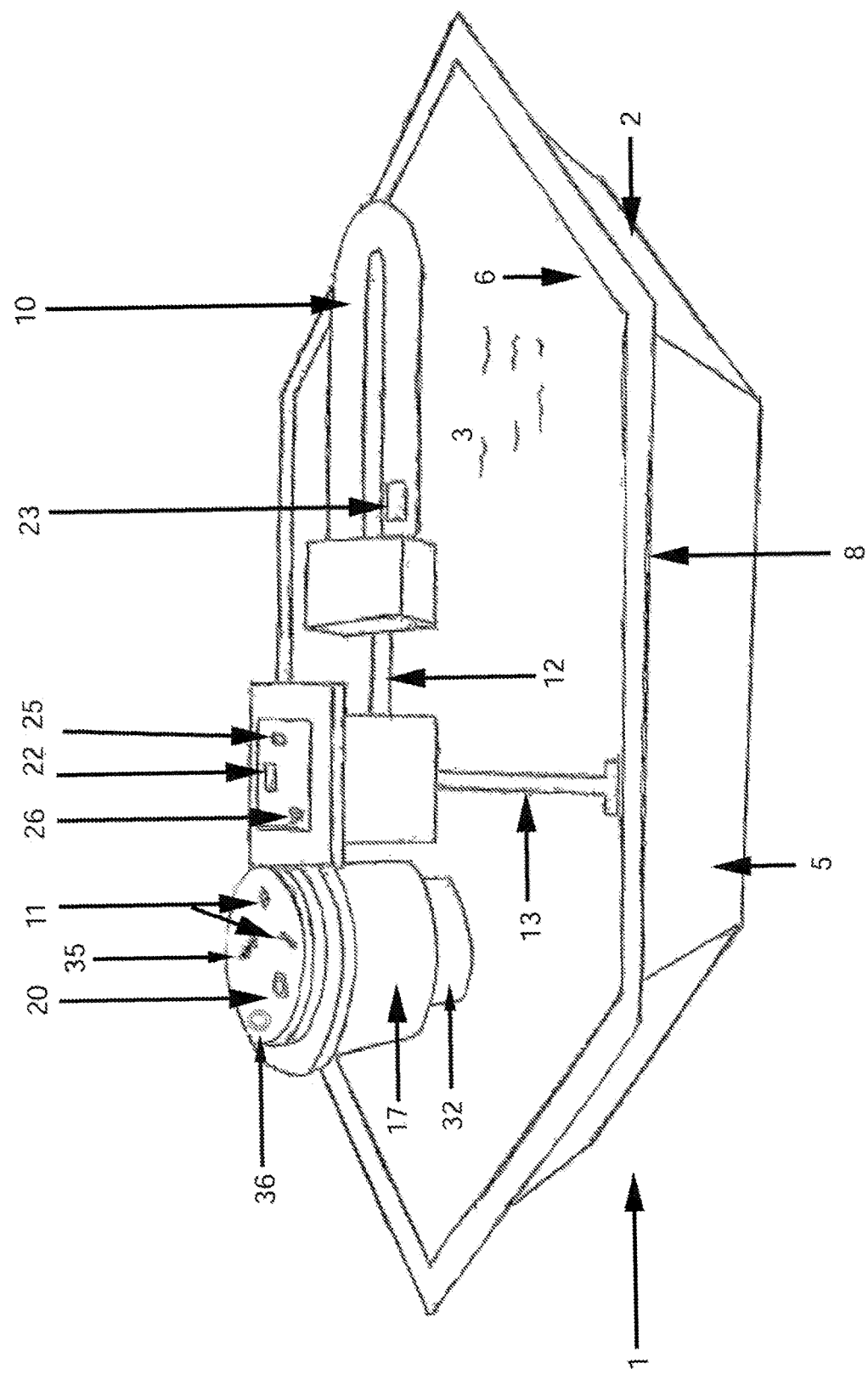
Figure 2:
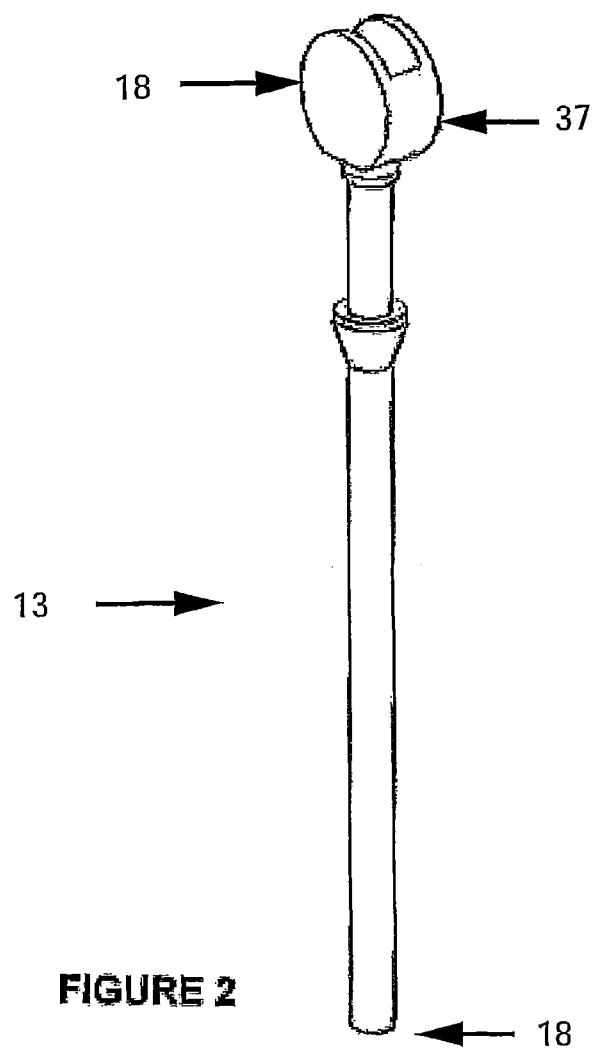
Figure 3:
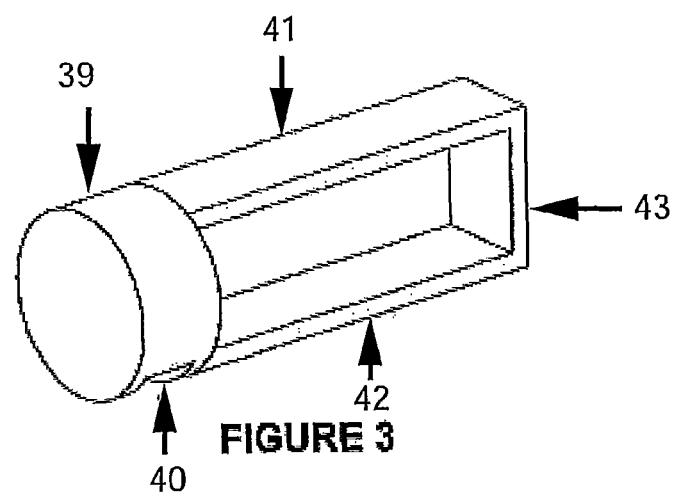

The bag 2 includes the following components of at least one heater including a first heating element 10, and housing including power connection means 11, electrical circuit 12 and switching components of at least one magnetic mechanical switch 13. The switching components are arranged to be electrically connected together inside the bag so that when the power connection means 11 is connected to a power source, it causes heating element 10 to be heated to heat the fluid at a certain temperature for a certain time.

Figure 4:
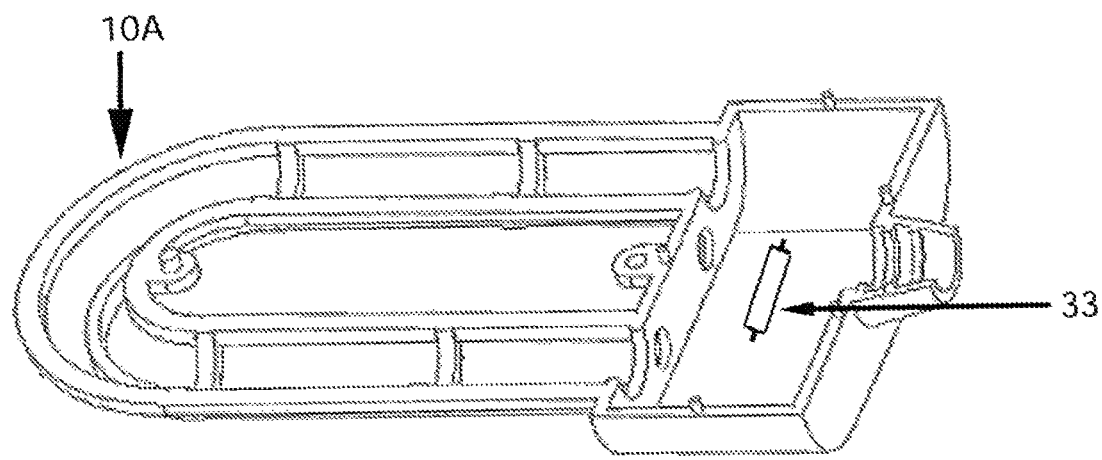
Figure 5:
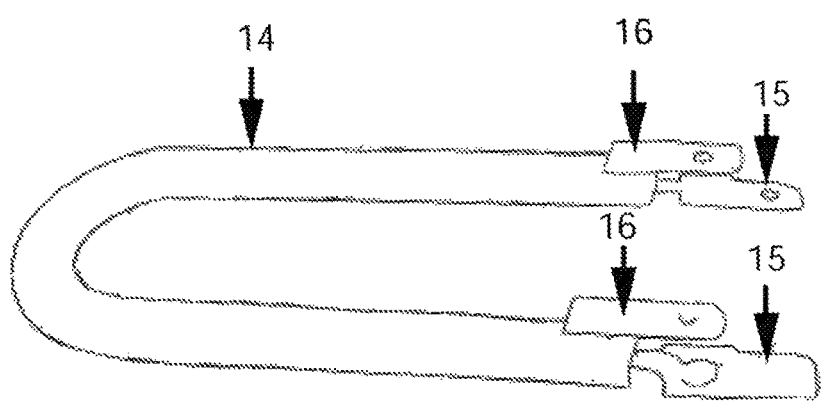

As shown in FIGS. 1, 4 and 5 the heating element 10 can be located in a heating cage 10a which is connected and supported to an inside surface of the bag 2. FIG. 4 only, shows how one half of the assembled heater cage. The heating element 10 can include a U shaped member 14 with connectors 15 and earth connectors 16 and heating wire. Electrical circuit 12 comprises wiring and suitable connections electrically connecting the heating wire of the heating element 10 to the power connection means 11. Power connection means 11 is housed in a housing 17 which may also be supported by the inside of the bag 2 and includes socket for a plug which is part of the power source. Housing 17 can include a rectangular box like structure forming a recessed space therein, with a removable lid.

In use the electric hot fluid bag is simply plugged into a power source and allowed to heat to a certain temperature for a certain time. For example, depending on the size of bag and element 10 including heating wire, the time to properly heat the fluid and bag can vary but as an example for a typical hand held bag only 10 minutes is required to heat. After heating, and unplugging or disconnection from the power source, the heated bag is ready for use as a portable device able to heat anything which such heating can last for approximately 5 hours.

The magnetic switch 13 is adapted to protect against a build up of gasses pressure and explosion and includes an elongate member having ends 18 wherein one end 18 is connected to the electrical circuit 12 located at one side of the inside of the bag and the other end 18 is connected to the inside of an other side of the container whereby the electrical circuit 11 can be broken if the bag expands beyond a certain distance between the insides of the bag or beyond a certain pressure.

Figure 8:
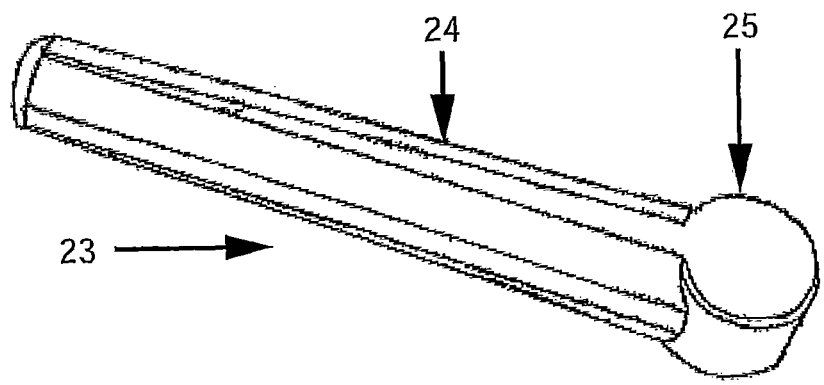

Housing 17 includes at least one bleed valve 20 located adjacent to power connection means which comprises at least one deformable aperture 21 located within a recess in the housing 17 which is adapted to remove excess pressure within the bag. As shown in FIG. 8 the hot or cold fluid bag can include a probe 23 which can be removably stored in a recess in the housing 17. Probe 23 is shaped as an elongate tapered member 24 with a head 25 at the thicker end whereby in use one holds the head to push the probe into the deformable aperture to let out or release air or gases held within the enclosed space. The bleed valve 20 can comprise a deformable member made up of two circular tubular members slidably interlocking with each other having the aperture formed as a central hole.

Double insulation is provided for all electrical circuits, connectors, wiring and switching components. The bag 2 can be of any suitable shape and formed for example, from a material comprising at least one ply of PVC. Alternatively material can have an outside material of 3 ply PVC with welded seams. Housing 17 includes at least one thermostat 32 for temperature control. The heating cage 10a as shown in FIG. 4 houses the heating element, electrical connections and a thermal fuse 33 and is sealed with resin for protection and waterproofing. Housing 17 includes at least one earth test point 35 to enable the earth connection to be verified. Housing 17 can also include an indication light 36 electrically connected to the power connection to confirm that power is connected to the circuit.

As shown in FIG. 1 the electrical circuit is formed as at least double insulated single bundle of wires going from the heating element 10 to the power connection means 11. The elongate member of the magnetic switch 13 can include a tubular structure which can be solid or hollow. End 17 of the elongate member includes an interlocking structure including a circular head structure 37 having a slot 38 therein which slidably inter-fits with an elongate bar member having an elongate body with a circular head 39 with complementary slot 40 at one end, with the rest of the body comprising two parallel bars 41 & 42 of a rectangular cross section with an end cross bar 43 at the end opposite to the circular head 39.

Figure 6A:
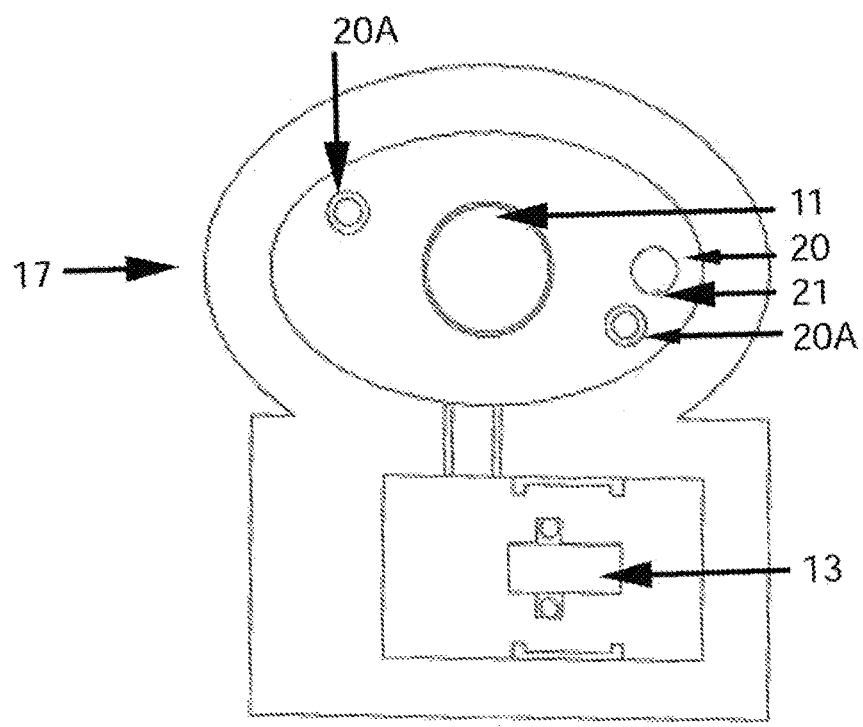
Figure 6:
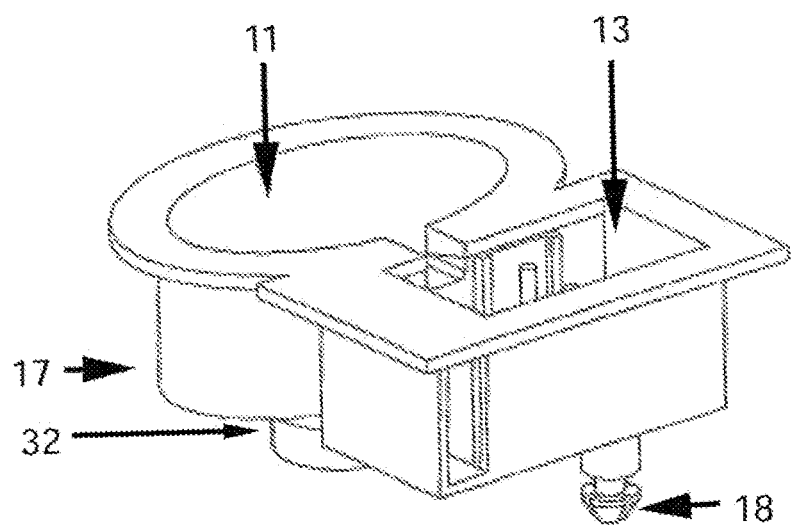
Figure 7:
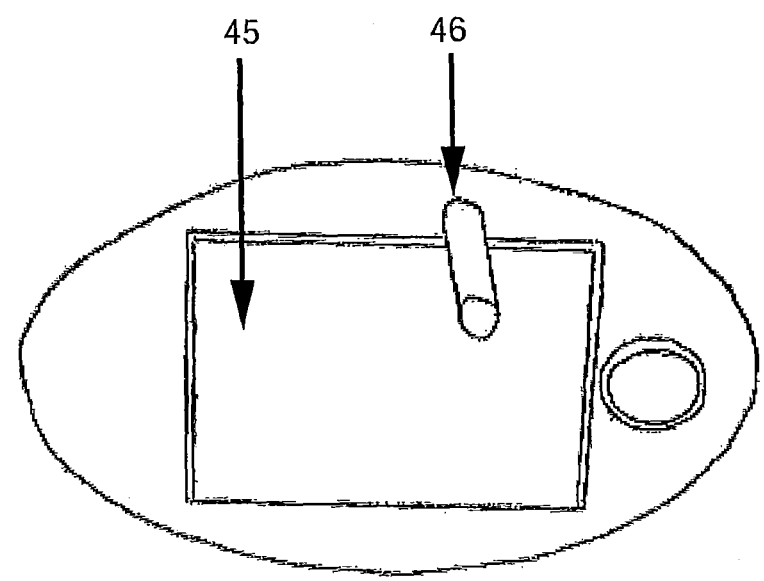

To complete the circuit the heads and slots inter-slide with each other so that if the bag expands too much one side will move away from the other side taking the elongate member with it which will cause the head 37 to move out of slots of head 39 to break the electrical circuit. As shown in the rear view of FIG. 7 at least part of the housing including the magnetic switch 13, can have a removable cover 45 affixed by a post 46 to fits and is affixed to hole 20a. FIGS. 6 & 6a show the housing in close up without the circuit.

Figure 9:
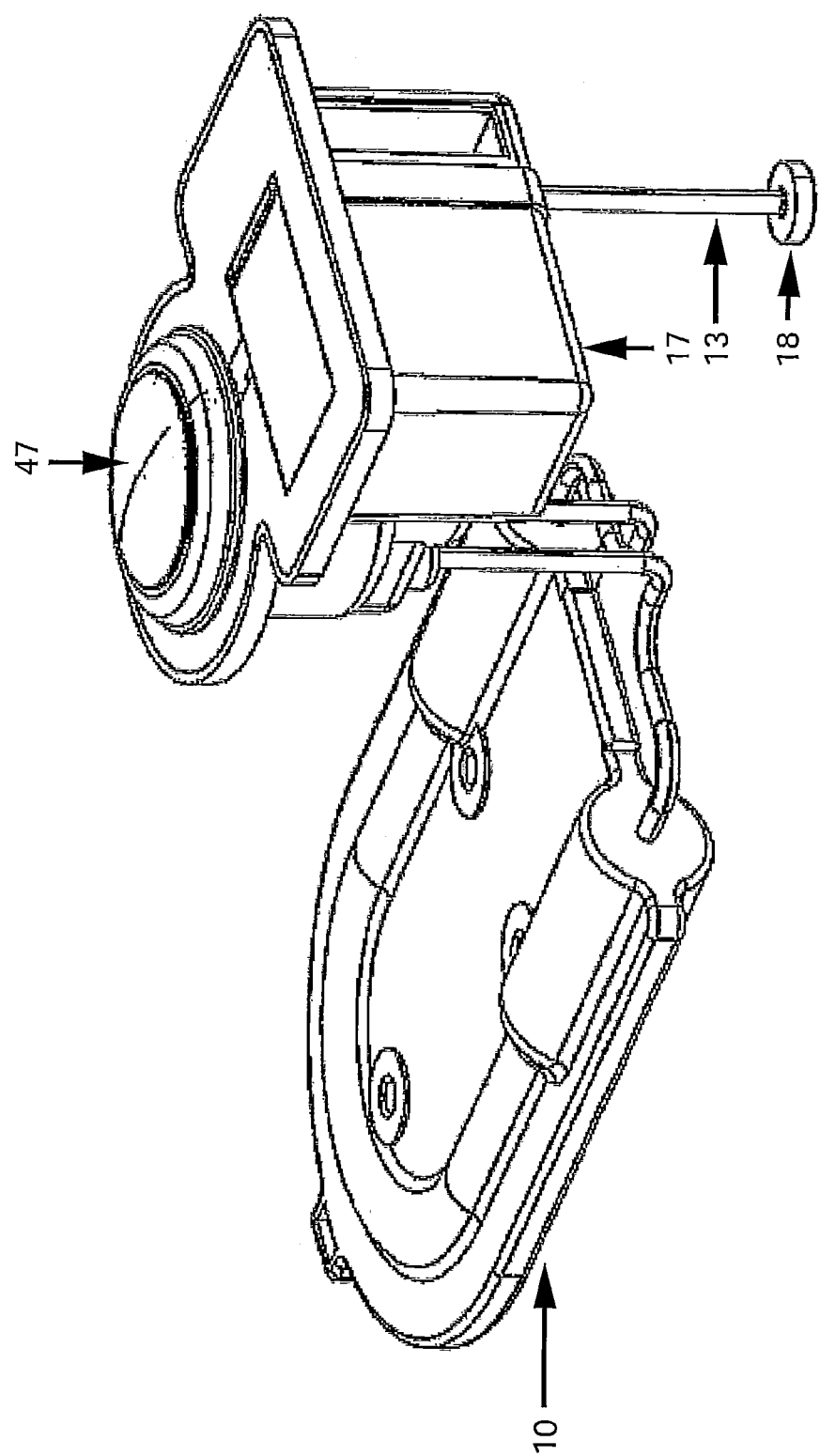

Second Heater Element—FIG. 9

FIG. 9 shows another example of the heater element in the form similar to the first heater element but with two wires protruding for electrical connected to a power source which can be called a second heater element. Also shown in an openable cap 47 to cover the power connection means 11. The outer casing of this heater element is formed of a plastic which is so thick or reinforced as to be considered as being double insulated. The outer casing can be a thermoplastic which can be injection moulded over a metal element or electrode.

Figure 10:
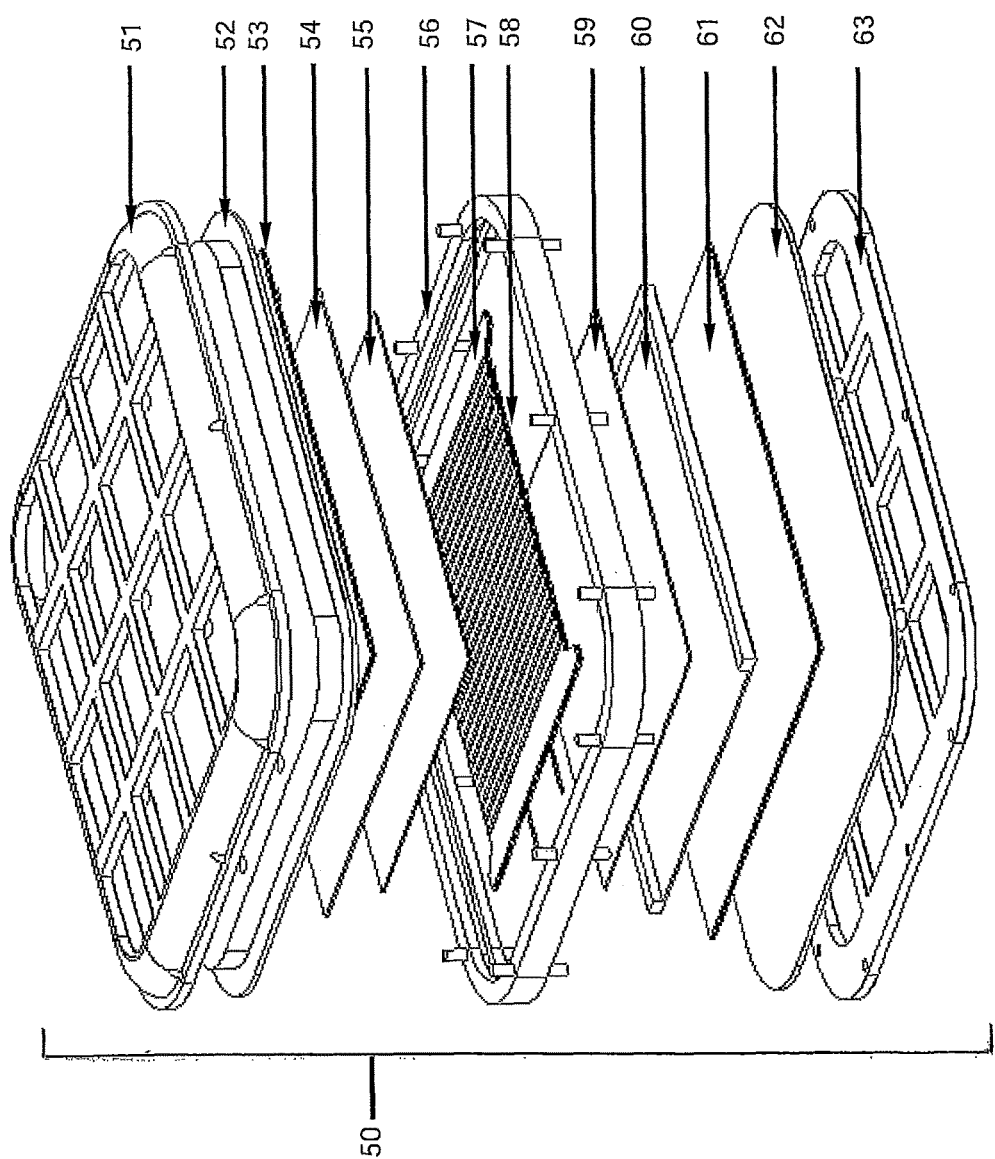
Figure 11:
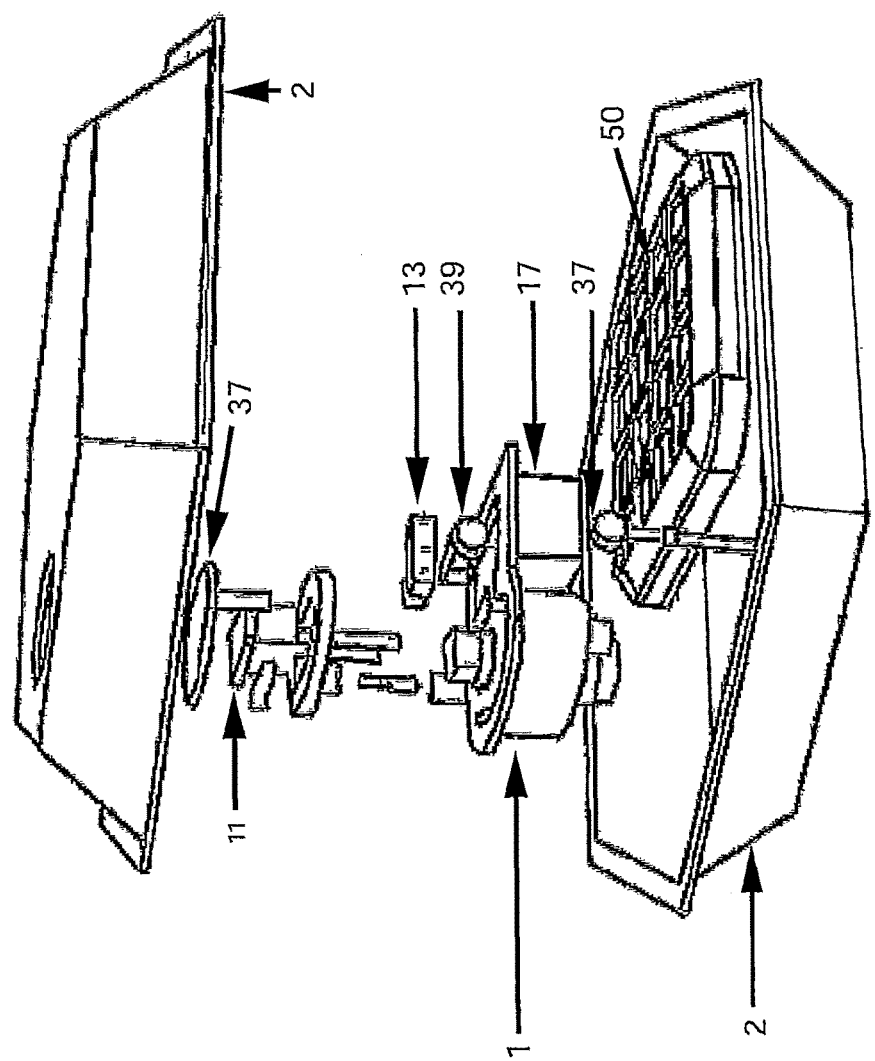
Figure 12:
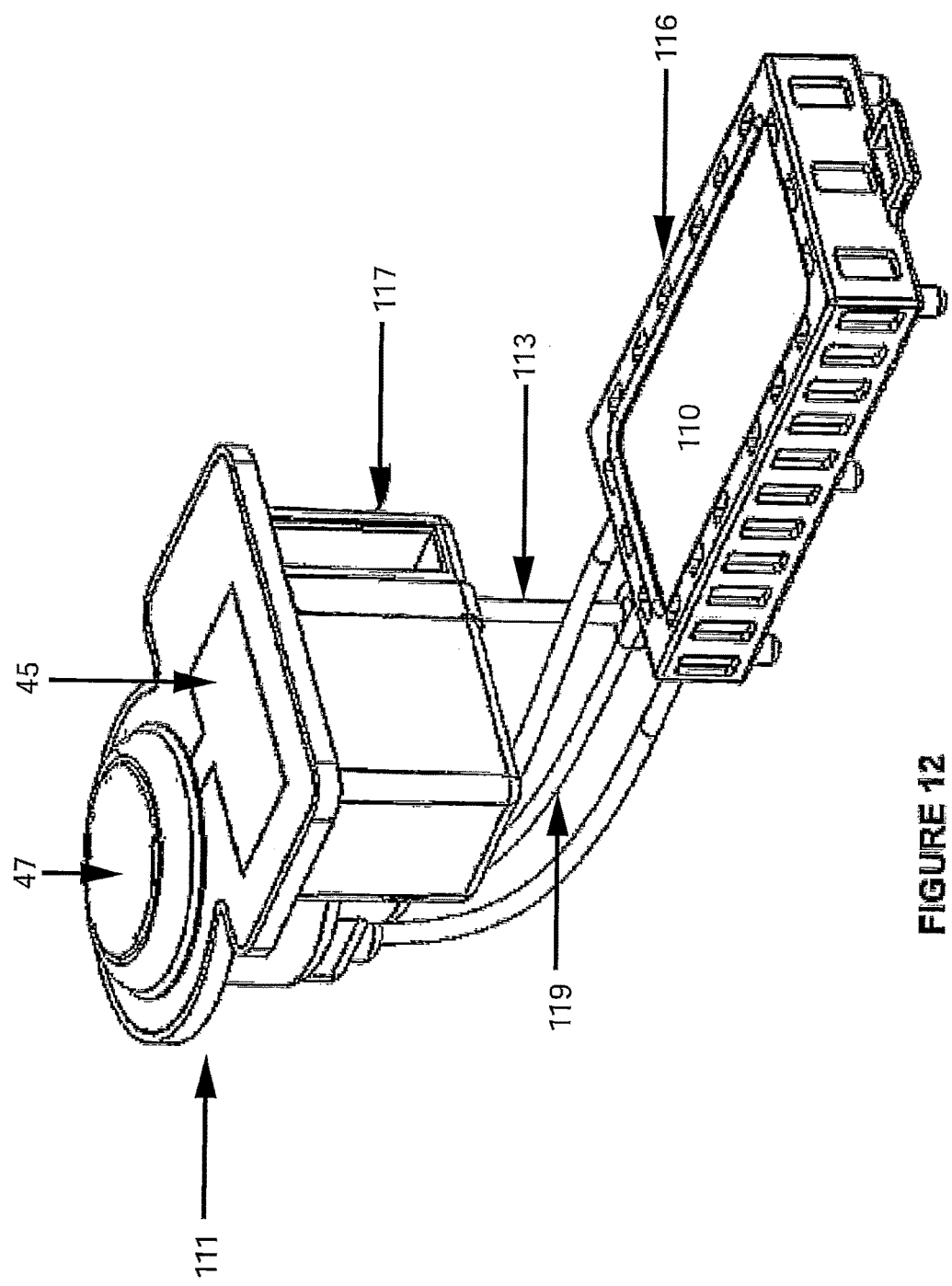
Figure 13:
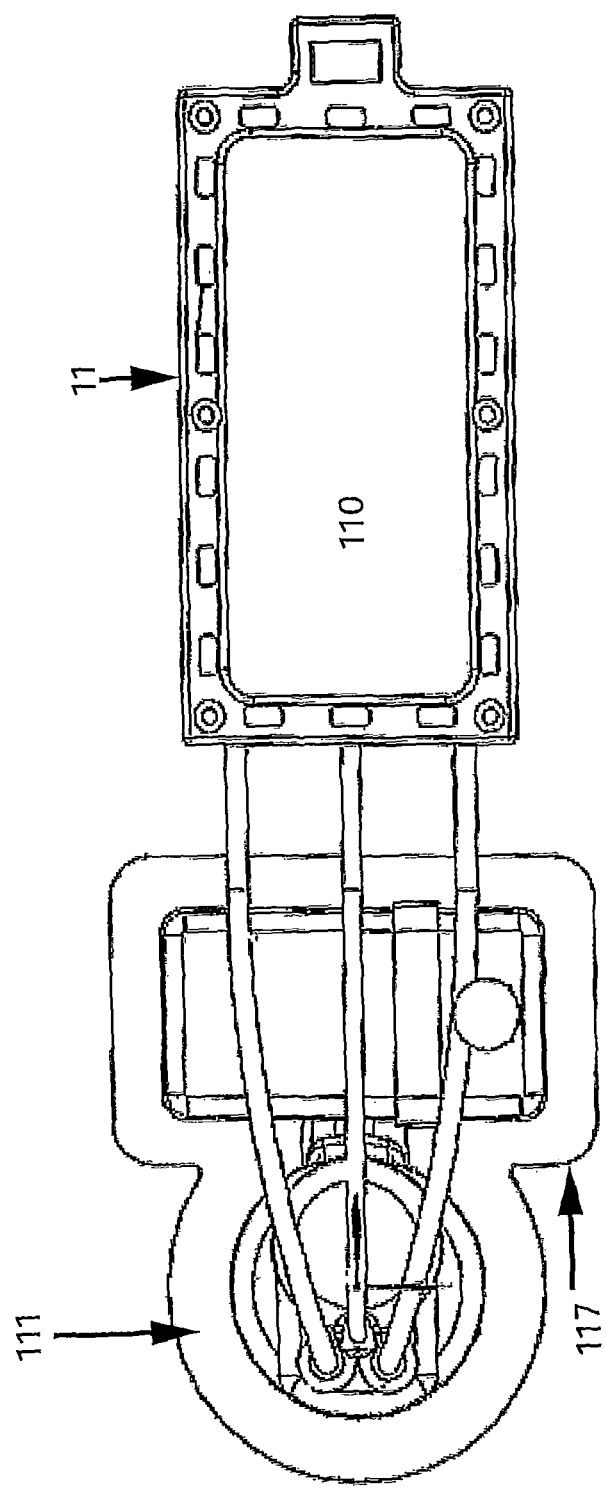
Figure 14:
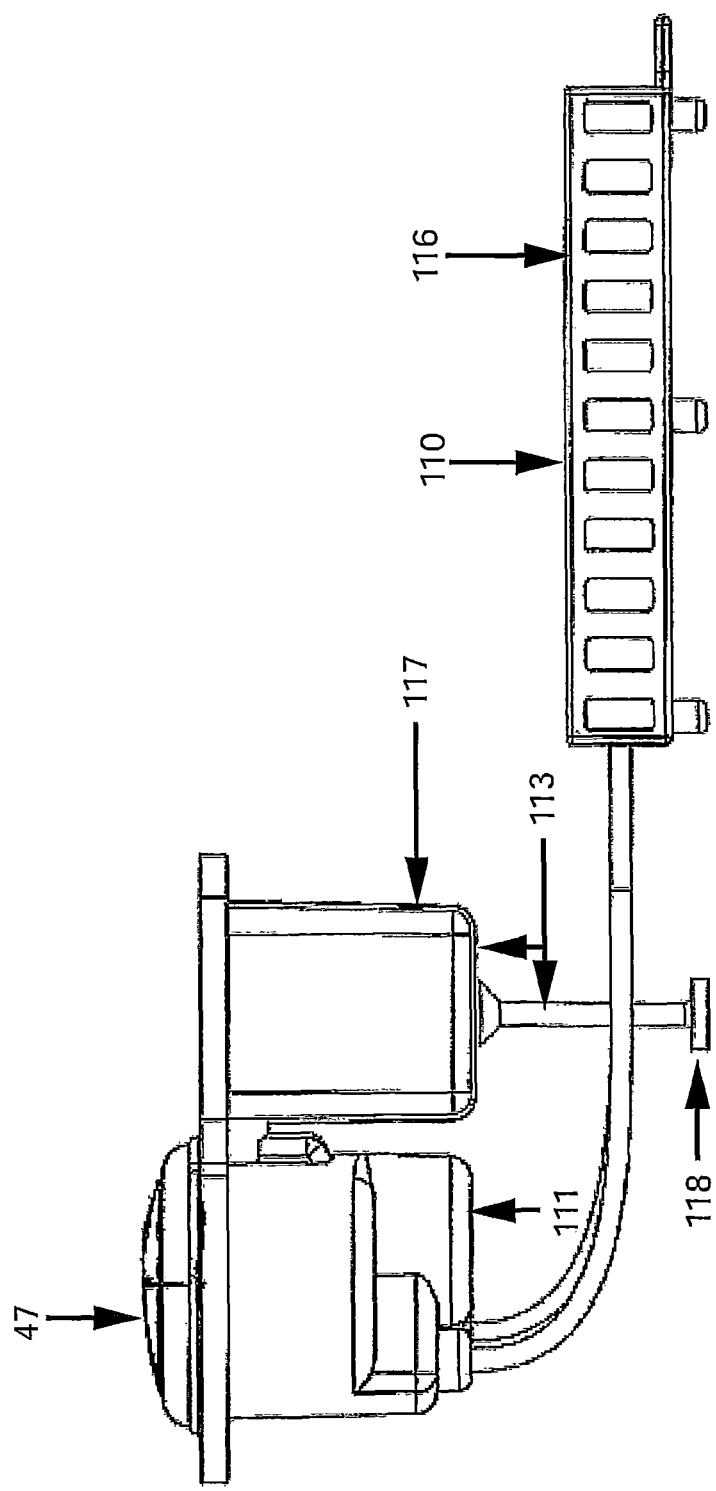
Figure 15:
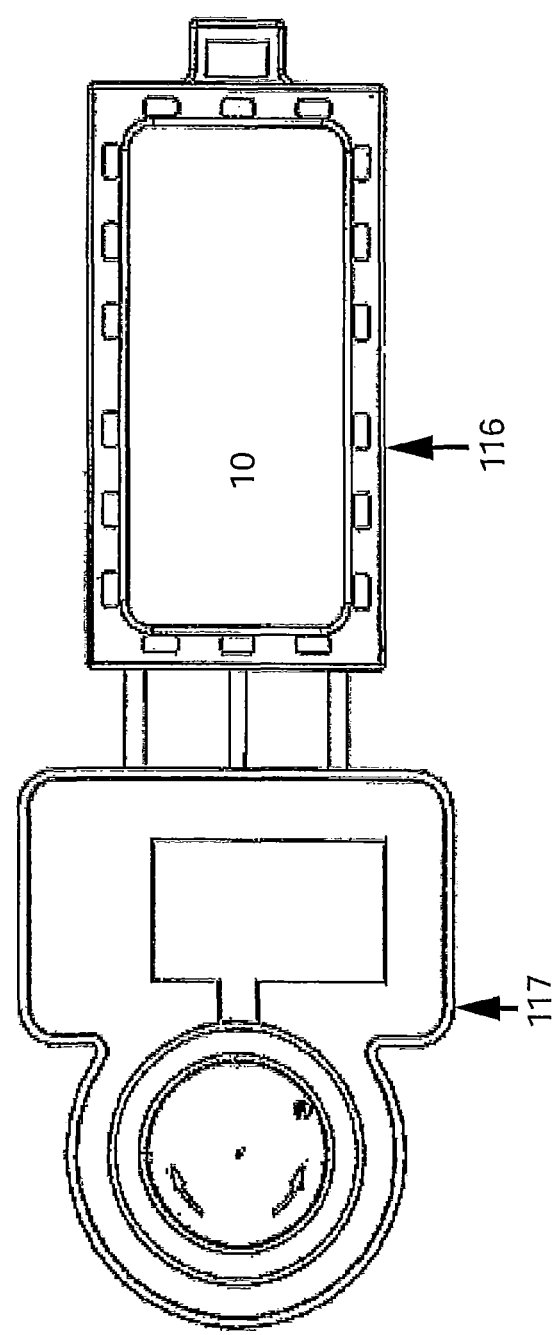

Third Heater Element—FIGS. 10 & 11

A third heater element is shown in FIGS. 10-11 which is another version of the heater element 10 of FIGS. 1, 4 and 5 and 9, which is referenced as heater element 50 which includes a double insulation layer, above and below the heating wires being electrically connected to the other components of the hot fluid bag. This heater element 50 is shaped as a substantially planar member made up of layered planar insulating sheet members and conducting sheet members whereas as the other heating element was U shaped, and includes the other components already disclosed i.e. the bag, the power connection means 11, housing 17 and mechanical magnetic switch 13, bleed hole 20, indication light and thermostat. This sheet like structure effectively increases the heating area and conductiveness to the heat sink and is designed as a double independent insulated individually sealed structure. The temperature fuse can be built in with heater element 50, as a power cut out means.

The conducting members in this heating element example can be aluminium material which is designed to spread or dissipate the heat to the water, better. In summary, there is an alternating sequence of insulating members and conducting members. As shown in FIG. 9 starting from one side of the heater element 50 there are several components starting from the top but described with reference to an inner portion:

first non conducting outer casing member 51 (plastics)
first outer conducting sheet 52 (outer aluminium shell)
first outer insulation sheet 53 (double mica sheet)
first inner conducting sheet 54 (inner aluminium sheet)
first inner insulation sheet 55 (mica sheet e.g. 0.4 mm thick)
middle outer perimeter ring 56 (plastic ring)
mica support skeleton support member for heating wire 57
heating wire 58 wound around the skeleton support member 57
second inner insulation sheet 59 (mica sheet)
second conducting sheet 60—(aluminium sheet)
second outer insulation sheet 61 (double mica sheet)
second outer conducting sheet 62 (aluminium sheet)
second non conducting outer casing member 63 (plastics)

Firstly the components can begin with the first non conducting outer casing member in the form of plastic protection casing 51 shaped as a grid like pattern member having a perimeter curved wall. The casing can be formed from a high temperature plastics. Underneath outer casing 51 there is a thermal and electrical conducting sheet 52 in the form of an outer aluminium shell shaped as a perimeter member having an upright wall and horizontal wall whereby the upright wall is dimensioned and shaped to slidably within the curved wall of the first non conducting casing 51 while the horizontal wall abuts an edge of the curved wall.

Below the outer casing 51 and conducting sheet 52 there is a combination of materials including first insulation sheet 53 formed of mica material as a sheet material extending over an area less than the area bordered by the conducting layer 52. First sheet 53 can be formed as a double sheet. Below the first insulation sheet 53 there is the first inner conducting sheet 54 in the form of an aluminium sheet material (e.g. foil of 1 mm thick) of a similar area to first insulation sheet 53. Below inner conducting sheet 54 there is a first inner insulation sheet 55 in the form of a mica sheet material 55.

Below second insulation sheet 55 there is the mica skeleton support member 57 which is designed and shaped to support the heating wire 58 which can be for example nickel chromium alloy which as shown in FIG. 8 extends in a loop into the skeleton member in parallel loops to return back out of the skeleton member and is connected by high temperature resistant wire connection to the power connection means 11.

Below and abutting skeleton member 57 and heating wire 58 there is the second inner insulation sheet 59 of a similar area to sheets 55 and 56. Below and abutting second inner insulation sheet 59 there is the second inner conducting sheet 60 which is also dimensioned having a similar area to sheet 59. However in this example second inner conducting sheet 60 is formed having a sheet bordered by an edging.

Below and abutting sheet 60 there is the second insulating sheet 61 being shaped and dimensioned to be larger in area that sheets 59 and 60. Further below and abutting a second outer insulation sheet 61 there is second outer conducting sheet 62. Sheet 61 can be formed as a double sheet of mica. Sheet 62 is larger in area to sheets 59 and 60. Finally at the very bottom or opposite end is the second outer casing 63 which is shaped as a planar grid like sheet having apertures therein.

In the middle of the above assembly of components, the middle outer perimeter ring member 66 is formed of a ring like elongate wall member having vertically extending prong members extending from the top and bottom of the elongate wall member. The prong members for the top can be aligned with or not the lower prong members. The top prong members are designed to slidably inter-fit with corresponding sized and positioned slots (not shown) in and underneath the first outer casing 51 to form an upper encased area. Edge member 66 has an area larger than sheets 53, 54, 55 & 59, 60, 61 and of a thickness that allows sheets 53, 54, 55, 57, 58 to be encased by the first outer case member 51 and middle ring member 56.

On the other side of middle ring member 66 the lower prong members are shaped to slidable inter-fit with corresponding slots in the second outer casing member 63 to encase sheets 59, 60, 61, 62.

Inner conducting sheet 60 is formed as sheet with an outer perimeter edge on at least three of the four sides forming a recessed area whereby sheet 59 can be slidably received therein said recessed area. On top of sheet 59, skeleton member 57 with the heated wire 58 can also be received within the recess area of sheet 60.

The first and second inner conductions sheets 54 and 60 (which contain the following sheet of mica sheet 55, mica skeleton support sheet 57, wires 58, mica sheet 59) can be joined together by any suitable means that seals the two aluminium sheets together to keep water or moisture from entering in between while compressing to bond the above sheets inbetween. For example this can be done by welding. Other connecting and sealing means can be uses such as epoxy. The outer casing members 51 and 63 can be connected or joined together to form an assembled heater element 50 to give for example a thickness of 6 mm. The casing members protect the assembly below and yet also allow the water to circulate over sheets and also function to space the heater element from direct contact with the bag walls. As an example power requirements may be 110V to 220V with power 450 watts. The wire can be wound in 1.5 mm spacing intervals and skeleton 57 may be 90 mm long×40 mm wide and a thickness of 1 mm.

Cold Fluid Bag

The invention can also include a cold fluid bag which comprises a bag having sides, adapted to provide an enclosed space for containing a fluid 3 therein and magnetic switch 13. In this example the fluid is adapted to be made cold by placing in a fridge. This fluid can include a type of antifreeze or mixture of antifreeze and water or any fluid that can be made cold or frozen. The cold fluid bag can also include at least one bleed valve 20 and probe.

Like in the hot fluid bag, magnetic switch 13 is adapted to protect against a build up of gasses pressure and explosion and includes an elongate member having ends. One end of the elongate member is connected to the electrical circuit 12 located at one side of the inside of the bag and the other end 17 is connected to the inside of another side of the bag. The electrical circuit 12 can be broken if the bag expands beyond a certain distance between the sides of the bag. The structure of the magnetic switch 13 can be the same as that described for the hot fluid bag.

Fourth Heater Element—FIGS. 12-15

Similarly to the other bags in FIGS. 1-11, there is shown a fourth heater element 110 which is electrically connected to a housing 117 having power connection means 111, and magnetic switching means 113 in a bag (not shown) with fluid therein being of similar construction to the other bags of FIGS. 1-11. In this example further heater element has three wires being electrically connected to the power connection means and magnetic switching means with one of the wires being a tester wire 119 with the other wires electrically connecting the prongs to the element. Also this further heater element is encased in an insulative support cage 116.

Fifth Heater Element—FIGS. 16-19

In this example, there is a fifth heater element 200 which is operatively combined with all the other components such as power connection means 217 and safety switching means 213 in a housing in a bag 202 with fluid contained therein. Also similar the other bags of FIGS. 1-15 fifth heater element as seen in FIGS. 16-20 has at least an outer housing, inner housing to house the power connection means and safety switching means.

Power connection means can include a thermostat, resister, a power plug housing base, electrical prongs (e.g. like that found in a plug), wiring, fixings, plug holder, led, end cap. Safety switching means includes a switch, horizontal slide, cover, elongate member with magnet at one end, slotted bar with another magnet. Fifth heater element 200 includes from the centre moving outwards, a first then second and a third combination of components.

The first combination includes from the centre, a heat generating member 201 (e.g. PTC positive temperature coefficient material) which is encased and abutted with an electrical connecting member which can include just power connecting member means in the form of electrodes with wires joined directly to the heat generating member 201 or they can be formed as a first outer electrode plate member 202 being part of an electric circuit and a second electrode plate member 203 being the other part of the electric circuit having ends. Each first and second electrode plate members having ends, or at least the electrodes, have power or electrical connection in the form of wires 204 connected thereto one end to allow connection to a power source.

Heat generating member 201 needs to be able to act as a resistor to convert electrical energy to thermal energy. For example heat generating member 201 having ends, can be made from any material that has dimensional stability, chemical resistance and is also particularly resistant to high temperatures and hydrolysis. For example heat generating member can include (PTC) positive temperature coefficient. Electrode plate members 202, 203 can be any material of any thickness that is able to allow current through and act as a heat sink such as for example gold, sliver copper brass steel, stainless steel or aluminium.

Completely encasing the first and second electrode plate members 202, 203 there is a first insulation member or layer in the form of a member 205 in the form of at least one sheet or film layer of any selected thickness having ends, followed by an abutting first heat conductive layer 206 in the form of a sheet member 206 of any selected thickness having ends. For example, film layer 205 can be formed from a polyimide compound and can be layered as a double insulation. First heat conductive sheet member or layer 206 is in the form of a sleeve having ends, which can be formed of any material able to conduct heat such as aluminium, steel, copper etc. Aluminium is useful because it is light weight and has strength. The ends, of heat conductive sheet member are adapted to receive inner end support members 207 i.e. a pair Inner end support member is formed as an insulation member which can be for example made of plastic or silicon.

The first combination being an inner most combination which supports and maintains outer combinations including the second and third combinations. Inner end support members 207 are shaped as a planar cap with at least one outwardly protruding aperture or hole 208 for the wire(s) 204 on one of the end members, to protrude there through, on one side of each cap and on the opposite side of the cap there is a protruding recessed lip portion or formation 209 sized and adapted to capture the ends of the first and second outer sheet members. The holes 208 are only provided on at least one of the inner end support members 207.

In summary the first combination can include for example, in cross section and in order from top to bottom:
first heat conductive member 206 (e.g. aluminium) with inner end support member 207
double layer of inner insulation layer 205
electrode plate 203/heat generating member 201/electrode plate 202 with wires 204
double inner insulation layer 205
first heat conductive member 206 (e.g. aluminium) with inner end support member 207

Outside of, encasing and abutting the first combination, there is the second combination which includes a second insulation sheet member or layer 210 which abuts the first heat conductive member 206 of the first combination. Second insulation sheet member 210 is formed as an elongate sleeve, shaped with ends which like the other insulation sheet layer 205, can be formed from or include any insulation material of any thickness and dimension, not able to conduct and able seal out any fluid, to provide a physical barrier to electricity, like for example plastics or polyimide. The second insulation sheet layer or member 210 can be formed from at least one insulation layer. In one example second insulation sheet layer 210r can be double insulated member.

As part of the second combination, encasing and abutting the second insulation sheet layer or member 210 is a second heat conducting layer or member 215 having open ends which are capped and fixed by middle end support members 212 which together support and keep all previous sheets in their appropriate separate positions. Middle end support members 212 are similar in shape and material to the inner end support members but are bigger in area than the inner support members, with similar apertures or holes 212a for the wires 204 on one of the middle end support members 212, as aligned with the other holes 208 of the inner end support member, but the lip formation 214 is adapted to fit within the ends of the second heat conducting sleeve member 215. Electrically supported by the first heat conducting sleeve member 206 but electrically connected to the electrodes 202 or 203, is an electrical connector 210a Outside of, encasing and abutting the second combination is a third combination. The third combination includes outer end support members 216 which are larger in area than the middle end support members 212. Outer end support members 216 abut the middle end support members 212 to also keep all sheets and sleeve member in various combinations in their proper positions with respect to each other. Outer end support members 216 also has apertures or holes 218 protruding at one outer side of a cap for the wires 204, having no lip but having a foot 219 whereby the outer end support members are L shaped in cross section with the foot 219 being slotted to allow fixing to the bag by any suitable means including fasteners, adhesive, heat sealing or more brackets etc. Outer end support members 216 are not formed necessarily of an insulation material but are formed from any material that enables proper support and connection to the second heat conducting sleeve 215 and the bag 202.

When assembled all apertures or holes 208, 212a, 218 are aligned (can include a protruding truncated conical shape which slidably interfit) to allow the wires 204 to go from the first and second sheets 202, 203 outwardly of the heat element to the power connection means 211. Outer end support members 216 also have fixing means 220 whereby suitable fasteners and or fittings (e.g. bolts and/or brackets and/or clamps) can be inserted to affix the outer end members to the outer aluminium sleeve to then keep all of the heater element components fixed and operationally, connected together. Outer end support member holes 218 are sealed around the wires 208 to prevent entry of fluid there through.

Middle end support members 212 are dimensioned in area to abut only part of the end edge of the second heat conducting sleeve members 215 to leave exposed a recessed perimeter end edge for attachment of the fasteners 220 from the outer end support members 216 to the second heat conducting sleeve 215 whereby the outer end support member is spaced from the exposed end forming a gap with only the fasteners bridging the gap there between. In other options there may not exposed end whereby the outer end support member can overlap with middle end support members so that fasteners 220 extend through the middle end support member to engage with the ends of second heat conducting member 215.

As shown in FIGS. 18, 18a and 18b, the housing 217 includes an inner housing 217a and outer housing 217b to form a double insulated housing. Also included is power connection means 217 which is supported and affixed to inner housing 217a and safety switching means 213 being electrically connected to the power connections means 217 to act as a method of cutting power to the bag or element 200 for any reason such as electrical fault or bag rupture or loss of fluid etc. Any type of override is possible such as for example a magnetic switching means or electronic fuse or solenoid.

Outer housing 217b is physically connected to at least the inside of the bag 202 to face or abut the fluid and power connection means 217 which includes any means able to electrically connect a power inlet to the heat element and/or heat generator 201 and/or electrode plates 202, 203 such as for example wireless or wire connection(s) 217c. The wire connection 217c can be in the form of one cable made up of more than one wire or there can be separate wires 210a with a wire conductivity testing means.

Inner housing 217a includes safety switching recess 230 which for example can be rectangular in shape and power connection recess 231 which for example can be circular in shape). The power connection means 217 which is operatively connected and supported by the power connection recess 231 includes a plug housing base 232 (for example can be cylindrical in shaped with a rectangular recess therein) for electrical prongs 233, followed by a plug holder 234 (for example can include a circular ring at top with cylindrical body with a rectangular recess) in shape with a rectangular recess) which slots over the plug housing based leaving the prongs 233 to be upwardly protruding through the base of the rectangular recess.

Finally, there is a power connecting end cap 236 (for example can be circular in shape with a fixing post) which allows for access to the prongs 233 to connect to a power source. A light 237 in the form of a LED can be included which will show whether the power is on or not. Movable fixing for the cap 236 to the plug holder 234 can include a spring and bolt fastener 240, though other types of fixing are also possible to affix the post underneath the cap 236 into a post base recess in holder 234. When assembled the protruding recess of the holder 234 slides into the recess of the housing base 232.

Safety switch recess 230 which is adjacent power connection recess 231 and is joined by a connecting recess 230a, includes the safety switching means 213. Safety switching means 213 includes an elongate member 238 having ends with one end being electrically connected by at least one magnet 238a with the power connection means, in a slotted elongate double bar 242 which bar 243 is slidably mounted on/in a horizontal slide plate 243 on each side of the recess 230 (drawings only show one slide which function to mount the switch 245 and in the bar 242 with the elongate member 238 into the recess of the inner housing 217a) and includes at least one magnet 242a located at one end protruding through aperture 241. When assembled magnet 238a abuts either directly or indirectly to form a magnetic connection there between to complete the power connection from the power connection means to the element. Distal end 238b of elongate member 238 protrudes through aperture 241 in recess 230, and extends to be connected or joined to an opposite inside of the bag wall so that if the bag expands too much to a desired level or pressure, the elongate member 238 moves with the bag wall to break the magnet 238a to magnet 242a connection in regard to the electrical connection at the opposite end to the power connection means. Safety switching means 213 includes a switch 245 (e.g. a micro switch) electrically connected to power connection means via connecting recess 230a. Recess 230 has a removable cover cap 246.

Figure 16:
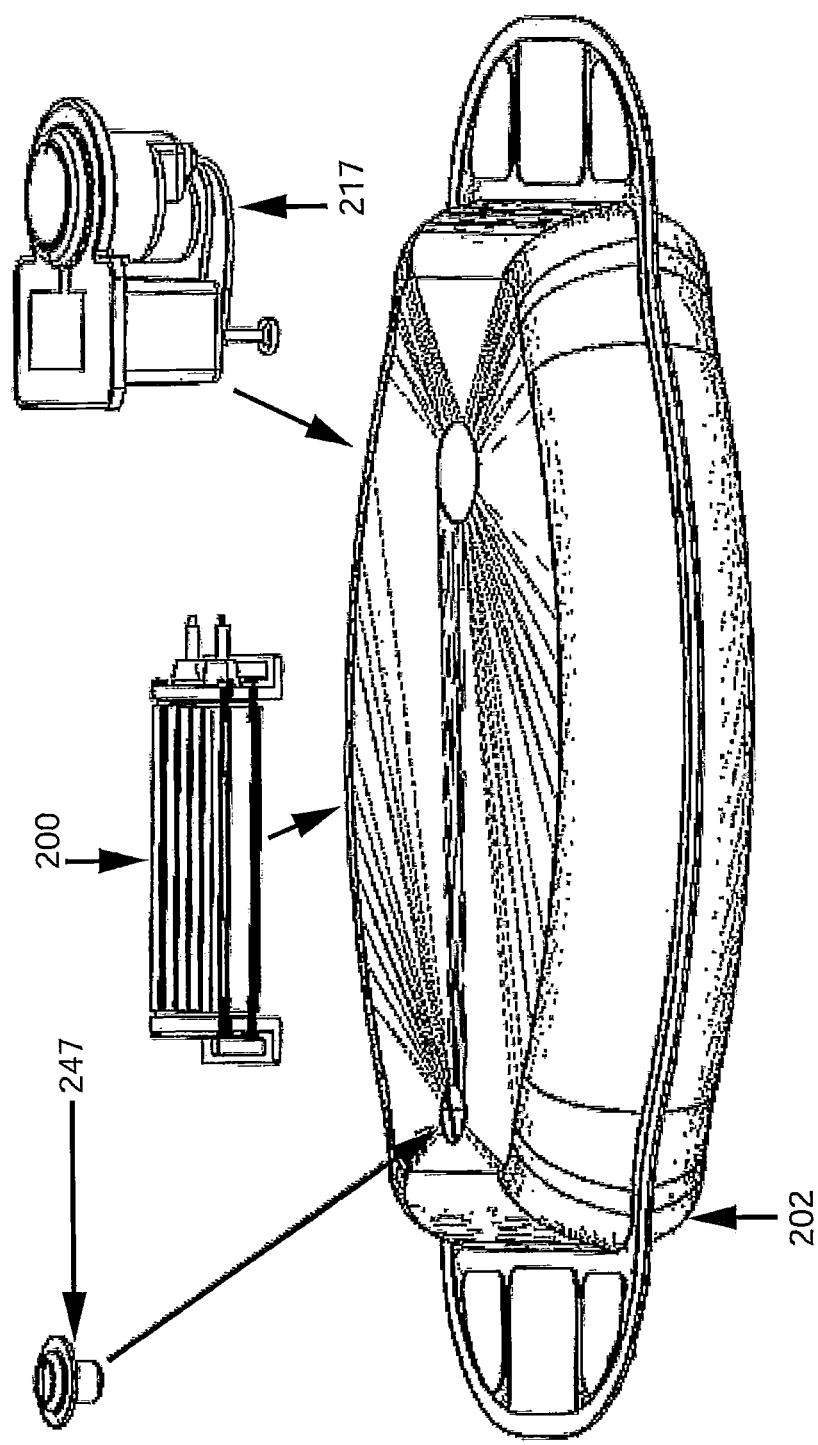
Figure 17:
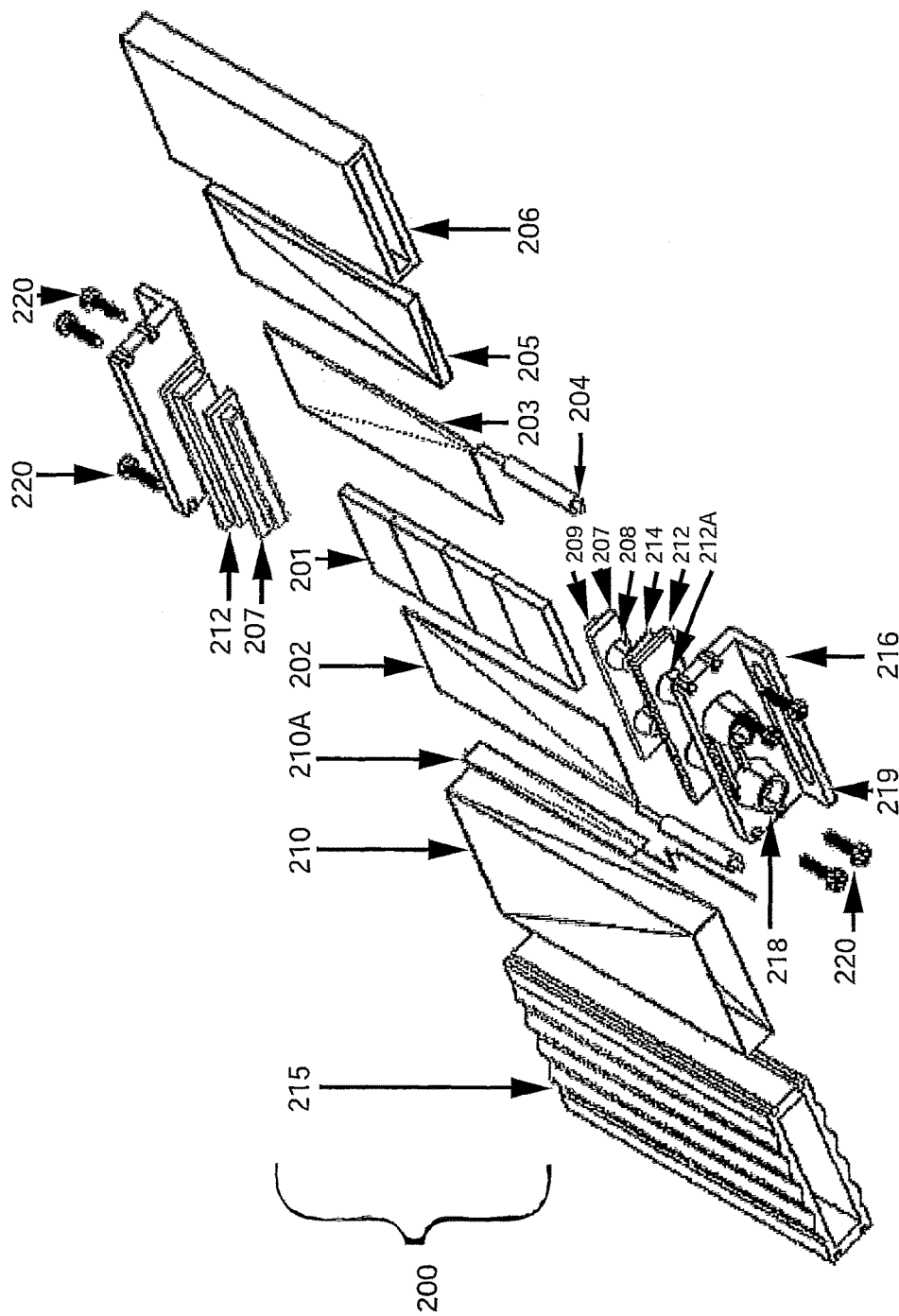
Figure 19:
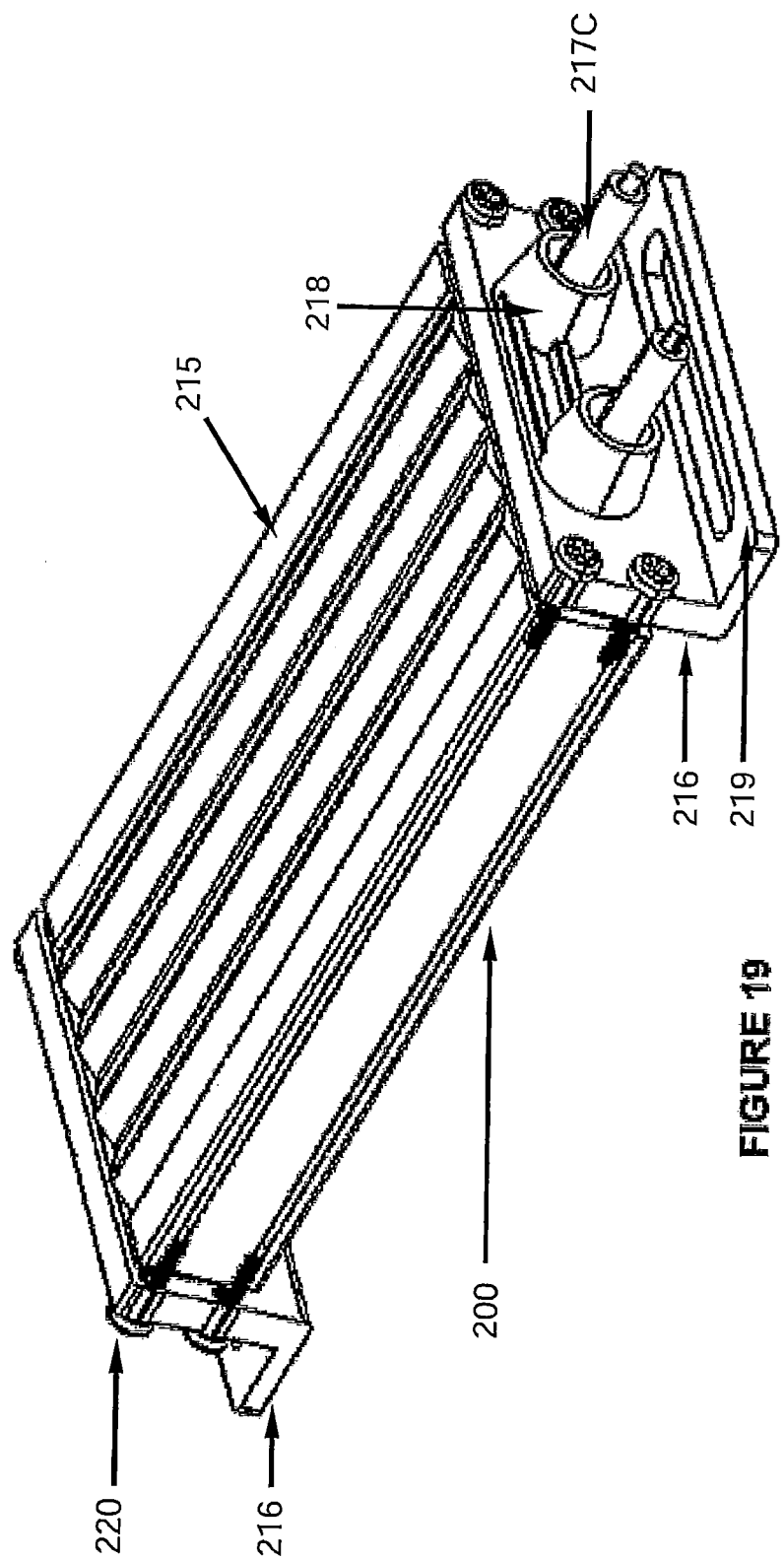

A thermostat 250 (e.g. can be tubular in shape) and resistor 250a can be included as an optional feature which can be operationally included with the power connection recess 231 to automatically cut power to the bag whenever a certain temperature is reached. Like the other versions any of the previous components can be combined or included. The fluid can include antifreeze or not, to allow the bag to be used as a hot water bottle or as a cooling bag. The bag of the present invention is designed to be cooled and heated with the following range of temperatures: −10° C. to 100° C. though any temperature is possible. The bag includes at least one openable and closable bag opening 247 to allow air or fluid to be inputted or emptied. The bag opening 247 can include a simple press releasable valve or a plug in a hole type valve as seen in FIG. 16.

It will also be understood that where a product, method or process as herein described or claimed and that is sold incomplete, as individual components, or as a "kit of Parts", that such exploitation will fall within the ambit of the invention.

These and other features and characteristics of the present invention, as well as the method of operation and functions of the related elements of structures and the combination of parts and economics of manufacture, will become more apparent upon consideration of the following description with reference to the accompanying drawings, all of which form part of this specification, wherein like reference numerals designate corresponding parts in the various figures.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention. Hence specific dimensions and other physical characteristics related to the embodiments disclosed herein are not to be considered as limiting.

Advantages
a) Electric shock prevention
b) Double insulated heater element
c) Able to let air out or bled air
d) Able to cut switch if bag expands too much
e) Modest cost
f) Easy to heat or cool
g) Retains heat for long period
h) Many safety features
i) Tested by approved authorities
j) Able to be used as bed warmer or personal warmer
k) Able to use as a heatable bag or coolable bag
l) Easy to use Variations Throughout the description of this specification, the word "comprise" and variations of that word such as "comprising" and "comprises", are not intended to exclude other additives, components, integers or steps. The bag can be formed of any suitable shape such as rectangular square or elongate depending on the type of use envisaged. The bag itself can be used to warm or cool anything or be used on any part of the body like for example as a bed warmer or personal warmer for the waist or neck. The heating element is shown as being horse shoe shaped or plate like but can be any shape. Optionally the bag can include various covers to improve or change the look and perhaps provide better heat retention or comfort, like for example a sheepskin cover.

It will also be understood that where a product, method or process as herein described or claimed and that is sold incomplete, as individual components, or as a "kit of Parts", that such exploitation will fall within the ambit of the invention. These and other features and characteristics of the present invention, as well as the method of operation and functions of the related elements of structures and the combination of parts and economics of manufacture, will become more apparent upon consideration of the following description with reference to the accompanying drawings, all of which form part of this specification, wherein like reference numerals designate corresponding parts in the various figures.

For the heater element 10, 50, 110, 200 there can be any number, thickness and shape of layers or sheets of insulating and conducting sheets to cause the heating wire to be properly insulated. For the other use of the bag i.e. instead of being a heatable bag, the fluid for the bag, can include other additives such as antifreeze or have a different fluid which can be a freezable material like antifreeze with water to enable the bag to be cooled. Alternatively the fluid or water from the bag can be emptied and replaced accordingly. In general the fluid can be designed to be cooled and heated within a range of minus 10 degrees Celsius to 100 degrees Celsius. Any temperature range is possible. Though the term "bag" is used, equally other terms relating to different uses are also possible such as for example foot warmers and heating pads, containers or pouches.

As shown in the figures like for example in FIGS. 16-19 the electrode plates can be rectangular in shape, the insulation layers can be shaped as sheets or sleeves, heat conductive shapes can also be as sheets or sleeves. The number of layers can be any number. For example heat conducting sheet 215 can be formed as a sleeve with an upper and lower face being grooved to further assist in heat transfer from the heater element. Also heat conducting sheet 215 has threaded holes to receive fixing means 219*a* to removably affix the outer end support member 216 to the heat conducting sheet 215. End caps 207 and 212 can be rectangular shaped with end cap 212 being larger than the inner end cap 207.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention. Hence specific dimensions and other physical characteristics related to the embodiments disclosed herein are not to be considered as limiting.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

What we claim is:

1. A heater element for a heatable fluid filled bag, the heater element comprising:
    a heat generating member having a power connecting member that is configured to heat the heater element when connected to a power source,
    a first insulation layer having ends,
    a first heat conducting layer having ends,
    a second insulation layer having ends,
    a second heat conducting layer having ends and middle end support members, and
    outer end support members abut the middle end support members on each end of the second heat conducting layer,
    wherein:
        the heat generating member is covered with the first insulation layer followed by the first heat conducting layer so that the first heat conducting layer covers the first insulation layer,
        the first insulation layer and the first heat conducting layer are held together at their ends with inner end support members such that the ends of the first insulation layer and the first heat conducting layer contact the inner end support members, the inner end support members being insulative,
        at least one inner end support member has at least one aperture to allow the power connecting member there through,
        at least one middle end support member has at least one aperture to allow the power connecting member there through,
        at least one outer end support member has apertures for the power connecting member to extend there through, the apertures being sealable to exclude fluid there through, and
        the apertures of the inner, middle and outer end support members are aligned to allow for electrical connection through all the apertures wherein each outer end support member is L shaped with a foot adapted to allow for connection to an inside of the bag and to be fixed to the ends of the second heat conducting member.

2. The heater element as claimed in claim 1, wherein:
    the power connecting member includes at least one electrode in the form of an electrode plate member electrically connected to the heat generating member such that the electrode sandwiches the heat generating member between electrode plate members, and
    the power connecting member includes at least one wire electrically connected to each electrode plate member to provide power connection between the heater element and the power connecting member.

3. The heater element as claimed in claim 1, wherein:
    the second insulation layer covers the first heat conducting layer and is in the form of a sleeve,
    the second heat conducting layer covers the second insulation layer and is shaped as a sleeve,
    the middle end support members are formed of insulation material and are adapted to slidably interfit into the ends of the second insulation layer and the second heat conducting layer to cover and abut the inner end support members.

4. The heater element as claimed in claim 1, wherein:
    the heat generating member is formed from a material with a (PTC) positive temperature coefficient,
    the first and second insulation layers are formed from plastics,
    the first and second heat conducting layers are formed from a metal in the shape of a sleeve, and
    the inner end support members and the middle end support members are formed as plate cap shaped members with an inner side having a protruding recessed lip portion, the apertures being formed as protruding cylindrical members on an opposite side of the plate cap to that of the lip portion.

5. The heater element as claimed in claim 1, wherein the first and second insulation layers are each formed as double insulation layers.

6. A heatable fluid filled bag adapted to be electrically connected to a power source, the fluid filled bag comprising:
    a bag enclosing a fluid,
    at least one heater element, and
    a housing including a power connection that is adapted to allow the bag to be electrically connected to a power source,
    wherein:
        the housing consists of at least one insulation layer,
        the heater element includes:
            a heat generating member having a power connecting member,
            a first insulation layer having ends, a first heat conducting layer having ends,
a second insulation layer having ends,
a second heat conducting layer having ends and middle end support members, and
outer end support members abut the middle end support members on each end of the second heat conducting layer
the heat generating member is covered with the first insulation layer followed by the first heat conducting layer so that the first heat conducting layer covers the first insulation layer, and
the first insulation layer and the first heat conducting layer are held together at their ends with inner end support members such that the ends of the first insulation layer and the first heat conducting layer contact the inner end support members, the inner end support members being insulative,
at least one of the inner end support members has at least one aperture to allow the power connecting member there through to connect to the power connection,
at least one middle end support member has at least one aperture to allow the power connecting member there through,
at least one outer end support member has apertures for the power connecting member to extend there through, the apertures being sealable to exclude fluid there through, and
the apertures of the inner, middle and outer end support members are aligned to allow for electrical connection through all the apertures wherein each outer end support member is L shaped with a foot adapted to allow for connection to an inside of the bag and to be fixed to the ends of the second heat conducting member.

7. The heatable fluid filled bag as claimed in claim 6, wherein:
the second insulation layer covers the first heat conducting layer and is in the form of a sleeve,
the second heat conducting layer covers the second insulation layer and is shaped as a sleeve,
the middle end support members are formed of insulation material and are adapted to slidably interfit into the ends of the second insulation layer and the second heat conducting layer to cover and abut the inner end support members.

8. The heatable fluid filled bag as claimed in claim 7, wherein:
the housing includes at least one inner housing including:
at least one recess for the power connection means, the recess for the power connection means including a plug housing base adapted to slidably interfit within the inner housing and being cylindrically shaped with a recess therein,
a plug holder having a cylindrical cap with a plug recess that is adapted to receive electrical prongs followed by a plug prong holder fitting, followed by an access end cap attachable to the bag,
another recess for a safety switching member that includes a slide housing, a switch, a bar member with a magnet, and an elongate member with a magnet joined at one end to the inside of the bag and an other end operatively connected by the power connection member to a switch and the power connection by abutting magnets,
the slide housing holding the bar member, the switch, and the elongate member having the magnet such that expansion of the bag walls with the elongate member causes magnets to separate to cause the power connection and the safety switch means to be non-electrically connected to the power source.

9. The heatable fluid filled bag as claimed in claim 8, wherein:
the heat generating member is formed from a material with a (PTC) positive temperature coefficient,
the first and second insulation layers are formed from plastics,
the first and second heat conducting layers are formed from a metal in the shape of a sleeve, and
the inner end support members and the middle end support members are formed as plate cap shaped members with an inner side having a protruding recessed lip portion, the apertures being formed as protruding cylindrical members on an opposite side of the plate cap to that of the lip portion.

10. The heatable fluid filled bag as claimed in claim 9, wherein:
the first and second insulation layers and housing are each formed as at least double insulation layers,
the bag includes an openable or closable bag opening in the form of a bleed valve or plug in hole to allow air or fluid to be inputted or emptied from the bag, and the bag includes a thermostat electrically attached to the power connection between the plug holder housing and a power connection recess, and
the end cap includes an LED to show whether it is electrically connected or not.

11. The heatable fluid filled bag as claimed in claim 10, wherein the bag includes the safety switching member, which includes a magnet located in the elongate member that is joined to a magnet in the safety switching means.

12. The heatable fluid filled bag as claimed in claim 11, wherein the fluid includes antifreeze to allow the bag to be cooled.

13. The heatable fluid filled bag as claimed in claim 12, wherein the fluid is configured to be heated by the heater element to a temperature between −10° C. to 100° C.

14. The heater element as claimed in claim 2, wherein:
the second insulation layer covers the first heat conducting layer and is in the form of a sleeve,
the second heat conducting layer covers the second insulation layer and is shaped as a sleeve,
the middle end support members are formed of insulation material and are adapted to slidably interfit into the ends of the second insulation layer and the second heat conducting layer to cover and abut the inner end support members.

15. The heater element as claimed in claim 2, wherein:
the heat generating member is formed from a material with a (PTC) positive temperature coefficient,
the first and second insulation layers are formed from plastics,
the first and second heat conducting layers are formed from a metal in the shape of a sleeve, and
the inner end support members and the middle end support members are formed as plate cap shaped members with an inner side having a protruding recessed lip portion, the apertures being formed as protruding cylindrical members on an opposite side of the plate cap to that of the lip portion.

16. The heater element as claimed in claim 3, wherein:
the heat generating member is formed from a material with a (PTC) positive temperature coefficient, the first and second insulation layers are formed from plastics, the first and second heat conducting layers are formed from a metal in the shape of a sleeve, and the inner end support members and the middle end support members are formed as plate cap shaped members with an inner side having a protruding recessed lip portion, the apertures being formed as protruding cylindrical members on an opposite side of the plate cap to that of the lip portion.

17. The heater element as claimed in claim 14, wherein:

the heat generating member is formed from a material with a (PTC) positive temperature coefficient the first and second insulation layers are formed from plastics, the first and second heat conducting layers are formed from a metal in the shape of a sleeve, and the inner end support members and the middle end support members are formed as plate cap shaped members with an inner side having a protruding recessed lip portion, the apertures being formed as protruding cylindrical members on an opposite side of the plate cap to that of the lip portion.

\* \* \* \* \*